(12) United States Patent
Yonekura et al.

(10) Patent No.: US 7,585,578 B2
(45) Date of Patent: Sep. 8, 2009

(54) FUEL CELL SYSTEM

(75) Inventors: Kenji Yonekura, Yokosuka (JP); Masatoshi Iio, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 793 days.

(21) Appl. No.: 11/172,930

(22) Filed: Jul. 5, 2005

(65) Prior Publication Data

US 2006/0008689 A1     Jan. 12, 2006

(30) Foreign Application Priority Data

Jul. 6, 2004     (JP)     ............... 2004-199400

(51) Int. Cl.
*H01M 8/04*     (2006.01)

(52) U.S. Cl. ............... 429/22; 429/24; 429/25

(58) Field of Classification Search ............ 429/22, 429/24, 25
See application file for complete search history.

(56) References Cited

U.S. PATENT DOCUMENTS

| | | | |
|---|---|---|---|
| 6,887,599 B2* | 5/2005 | Reiser et al. ............ | 429/25 X |
| 7,105,243 B2* | 9/2006 | Morishima et al. ............ | 429/25 |
| 2001/0024747 A1* | 9/2001 | Sang ............ | 429/25 X |
| 2003/0039869 A1* | 2/2003 | Murakami et al. ............ | 429/25 X |
| 2003/0129462 A1 | 7/2003 | Yang et al. | |
| 2004/0001980 A1 | 1/2004 | Balliet et al. | |

FOREIGN PATENT DOCUMENTS

JP     11-097047 A     4/1999

* cited by examiner

*Primary Examiner*—Stephen J. Kalafut
(74) *Attorney, Agent, or Firm*—Foley & Lardner LLP

(57) ABSTRACT

A system controller drives a gas circulator with a purge valve closed to supply hydrogen to a fuel cell stack and then increases anode operating pressure and cathode operating pressure to target operating pressures after a predetermined condition is satisfied. This allows an amount of gas mixture of remaining oxygen and hydrogen to be suppressed compared to the case of increasing the anode operating pressure in a state where oxygen remains in the anode circulation path. Accordingly, it is possible to suppress local generation of electric potential and heat and prevent degradation of the components of the fuel cell stack. Moreover, hydrogen is not discharged during activation, which eliminates the need to include dilution equipment of combustion equipment for treating hydrogen and increases the degree of freedom in the layout of the fuel cell system.

16 Claims, 22 Drawing Sheets

FUEL CELL SYSTEM

BACKGROUND OF THE INVENTION

The present invention relates to a fuel cell system, and specifically, relates to a technology to activate a fuel cell without degrading components of the fuel cell and without discharging fuel gas to the outside.

In a general polymer electrolyte fuel cell (hereinafter, abbreviated as a fuel cell), while power generation is stopped, oxidant gas flows from a cathode into an anode through a polymer electrolyte membrane, and a gas mixture of the oxidant gas and fuel gas is generated in the anode. In such a background, as disclosed in the Japanese Patent Laid-Open publication No. 11-97047, in a conventional fuel cell system, the oxidant gas and fuel gas are purged with nitrogen gas while power generation is stopped. In activation of the fuel cell, operating pressure on the anode side is increased, and then the oxidant gas is supplied to the cathode. Subsequently, an exhaust valve is opened to discharge the nitrogen gas and gas mixture remaining in the anode.

SUMMARY OF THE INVENTION

However, when the anode operating pressure is increased during activation of the fuel cell like the conventional fuel cell system, the gas mixture reacts on an anode catalyst, and electric potential and heat are locally generated, thus degrading the fuel cell. Moreover, when the exhaust valve is opened and the nitrogen gas and gas mixture remaining in the anode are discharged, the fuel gas is discharged together with the nitrogen gas and gas mixture, and an amount of fuel gas required to activate the fuel cell is accordingly increased. Furthermore, the fuel gas is discharged together with the nitrogen gas and gas mixture, and dilution equipment or combustion equipment is required for treating the fuel gas, which makes it difficult to simplify the layout of the fuel cell system.

The present invention was made for solving the aforementioned problems, and an object of the present invention is to provide a fuel cell system capable of quickly activating a fuel cell without degrading the fuel cell and discharging fuel gas.

To solve the aforementioned problem, in a fuel cell system according to the present invention, in activation of the system, the gas circulator is driven with the purge valve closed, and the fuel gas is supplied to the anode from the fuel gas supply unit. The anode operating pressure is increased to target operating pressure after a predetermined condition is satisfied.

The fuel cell system according to the present invention is capable of reducing the amount of gas mixture of remaining oxygen and hydrogen and suppressing local generation of electric potential and heat due to the reaction of the gas mixture on the anode catalyst. It is therefore possible to prevent degradation of the components of a fuel cell stack. The fuel cell system does not discharge hydrogen when activated and does not need to include dilution equipment or combustion equipment for dealing with hydrogen, thus increasing the degree of freedom in the layout of the fuel cell system.

DETAILED DESCRIPTION OF THE PREFERRED EMBODIMENTS

Hereinafter, a description is given of configurations and operations of fuel cell systems as embodiments of the present invention with reference to the drawings.

Figure 1:
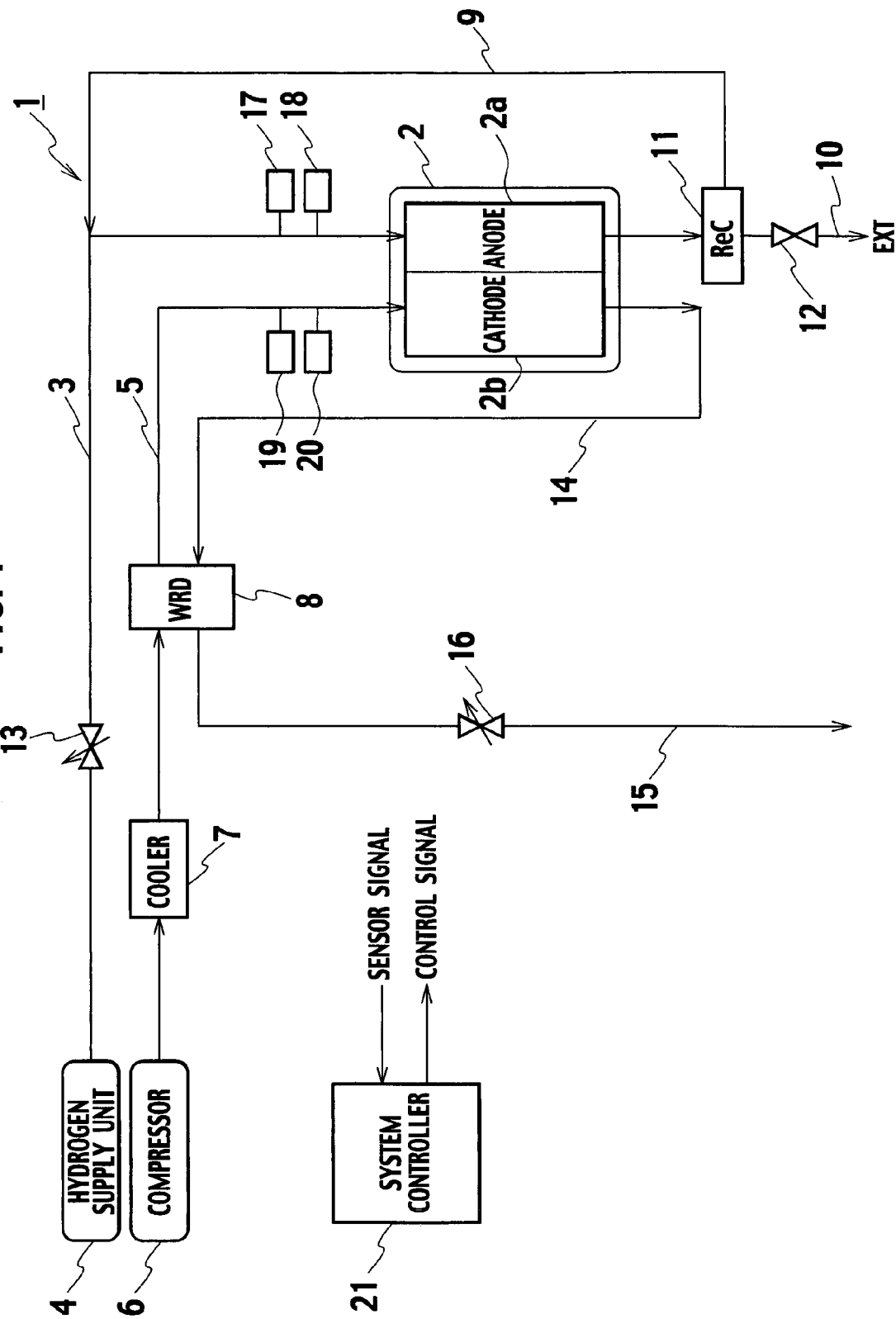
FIG. 1 is a block diagram showing a configuration of a fuel cell system as a first embodiment of the present invention.

A fuel cell system 1 as a first embodiment of the present invention includes, as shown in FIG. 1, a fuel cell stack 2, a hydrogen supply unit 4, a compressor 6, an aftercooler 7, and a humidifier unit 8. The fuel cell stack 2 includes a plurality of fuel cells stacked, and the fuel cells generate electricity using hydrogen and air. The hydrogen supply unit 4 supplies hydrogen to an anode 2a of the fuel cell stack 2 through a hydrogen supply pipe 3. The compressor 6 supplies air to a cathode 2b of the fuel cell stack 2 through an air supply pipe 5. The aftercooler 7 cools the air supplied to the cathode 2b to a temperature suitable for power generation of the fuel cells. The humidifier unit 8 humidifies the air supplied to the cathode 2b.

The fuel cell system 1 further includes a gas circulator 11, a purge valve 12, a pressure regulating valve 13, a pipe 14, an exhaust pipe 15, and a pressure regulating valve 16. The gas circulator 11 circulates hydrogen which has not been consumed and discharged from the anode 2a as anode off gas through an anode circulation path 9 into the hydrogen supply pipe 3 or discharges the anode off gas through an exhaust pipe 10. The purge valve 12 controls the anode off gas discharged through the exhaust pipe 10. The pressure regulating valve 13 regulates pressure of hydrogen flowing through the hydrogen supply pipe 3. Through the pipe 14, air containing oxygen, part of which is already consumed, and containing moisture generated by power generation is supplied to the humidifier unit 8 as cathode off gas. Through the exhaust pipe 15, the cathode off gas is discharged from the humidifier unit 8. The pressure regulating valve 16 regulates pressure of the cathode off gas discharged through the exhaust pipe 15.

In addition, the fuel cell system 1 includes an anode inlet pressure sensor 17, an anode inlet temperature sensor 18, a cathode inlet pressure sensor 19, a cathode inlet temperature sensor 20, and a system controller 21. The anode inlet pressure and temperature sensors 17 and 18 detect pressure and temperature of hydrogen supplied to the anode 2a, respectively. The cathode inlet pressure and temperature sensors 19 and 20 detect pressure and temperature of air supplied to the cathode 2b, respectively. The system controller 21 outputs control signals according to results of detection by these sensors to control operations of the entire fuel cell system 1. The system controller 21 functions as a controller according to the present invention.

Figure 2:
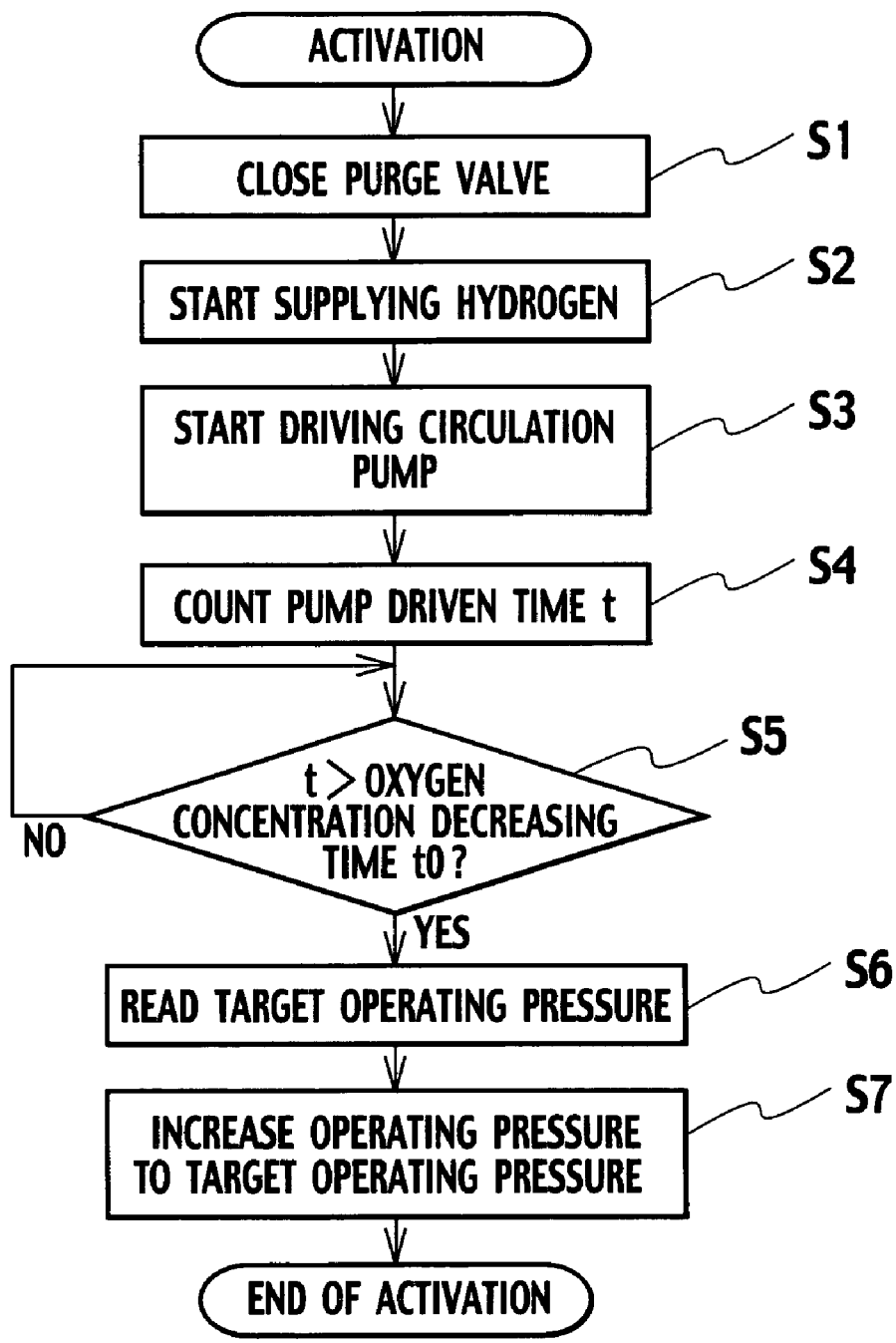
FIG. 2 is a flowchart showing a flow of an activation process by the fuel cell system shown in FIG. 1.

In the fuel cell system 1 as the first embodiment of the present invention, the system controller 21 executes the following activation process to activate the fuel cell system 1 without causing degradation of the fuel cells and discharging the fuel gas. Hereinafter, a detailed description is given of an operation of the system controller 21 executing the activation process with reference to FIGS. 2 and 3. FIG. 2 shows a control flow of the system controller 21, and FIG. 3 shows temporal change in proportions of gas components and operating pressure within the anode circulation path 9 during the activation process.

[Activation Process]

Figure 3:
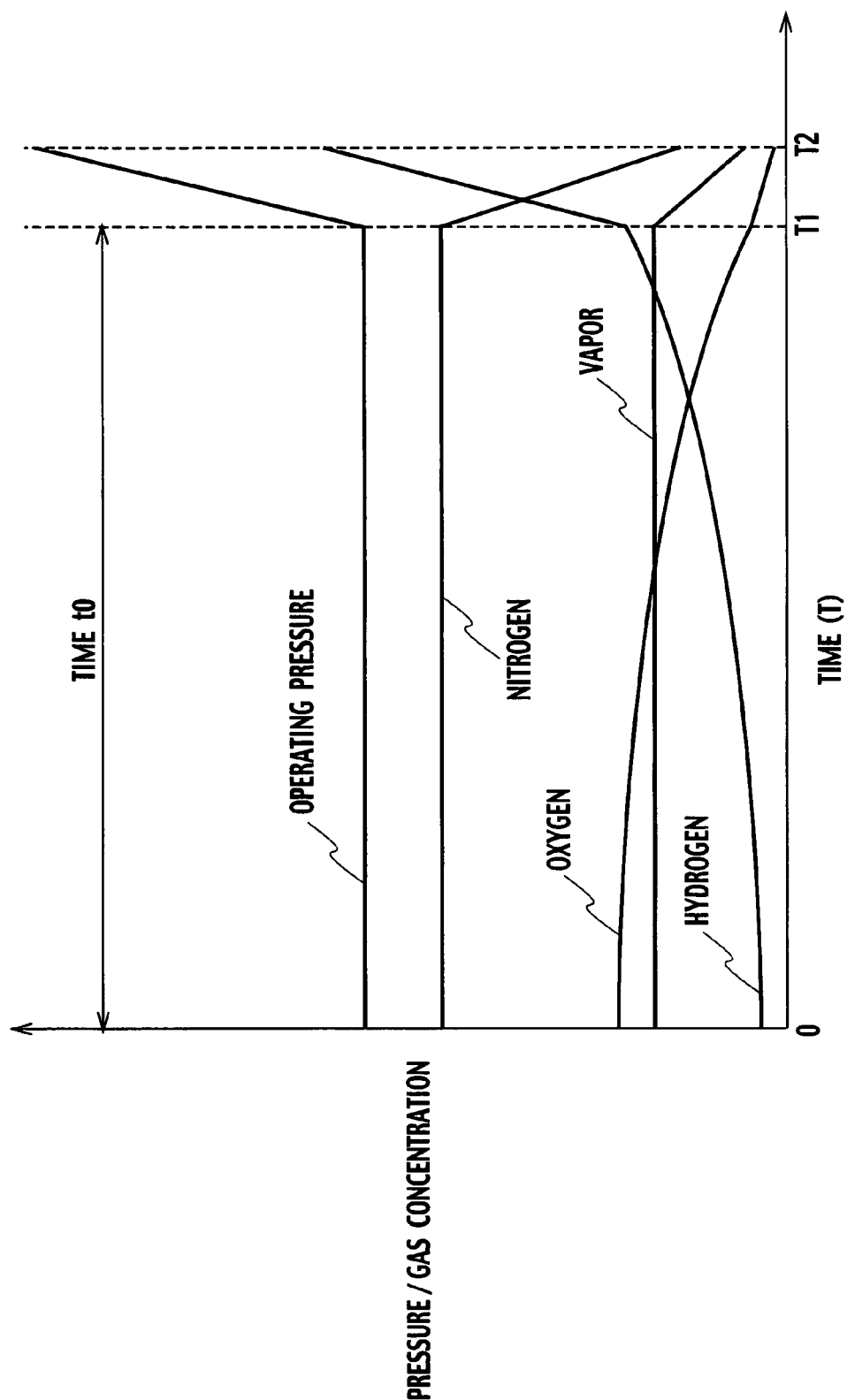
FIG. 3 is a diagram showing temporal change in proportions of gas components and operating pressure in an anode circulation path during the activation process shown in FIG. 2.

The flowchart shown in FIG. 2 starts upon an instruction to activate the fuel cell system 1 being inputted to the system controller 21 (at the time T=0 in FIG. 3). The activation process proceeds to a process of step S1.

In the process of the step S1, the system controller 21 closes the purge valve 12 to prohibit discharge of the anode off gas from the exhaust pipe 10. The process of the step 1 is thus completed, and the activation process proceeds from the process of the step 1 to a process of step S2.

In the process of the step S2, the system controller 21 starts driving the hydrogen supply unit 4 to start supplying hydrogen to the anode 2a. While supplying hydrogen to the anode 2a, the system controller 21 controls an opening of the pressure control valve 13 according to a value detected by the anode inlet pressure sensor 17 such that the operating pressure remains constant as shown in FIG. 3. In this embodiment, a target value of the operating pressure of the fuel cells is calculated in advance such that hydrogen concentration in the anode 2a and anode circulation path 9 is not more than LFL (4%) at the start of activation. The process of the step S2 is thus completed, and the activation process proceeds from the process of the step S2 to a process of step S3.

In the process of the step S3, the system controller 21 starts driving the gas circulator 11 to mix oxygen remaining in the anode 2a and hydrogen supplied to the hydrogen supply unit 4 and supply the gas mixture to the anode 2a. The process of the step S3 is thus completed, and the activation process proceeds from the process of the step S3 to a process of step S4.

In the process of the step S4, the system controller 21 starts counting time t (pump driven time) elapsed from the start of the operation of the gas circulator 11. The process of the step S4 is thus completed, and the activation process proceeds from the process of the step S4 to a process of step S5.

In the process of the step S5, the system controller 21 determines whether the pump driven time t is greater than oxygen concentration decreasing time t0. Upon the pump driven time t becoming greater than the oxygen concentration decreasing time t0 (at the time T=T1 in FIG. 3), the system controller 21 advances the activation process to a process of step S6. Herein, in this specification, the "oxygen concentration decreasing time" is a time for the oxygen concentration to be reduced to such a value that degradation of components of the fuel cell stack 2 due to local generation of electric potential and heat by a chemical reaction of the gas mixture of hydrogen and oxygen is not caused even when the operating pressure is increased. The oxygen concentration decreasing time is calculated in advance based on basic data including experimental data. Until the pump driven time t becomes the oxygen concentration decreasing time t0 or more, the anode 2a is supplied with the gas mixture of hydrogen and oxygen, and oxygen is consumed by the chemical reaction on an anode catalyst. Accordingly, the oxygen remaining in the anode circulation path 9 is gradually consumed, which can suppress the local generation of electric potential and heat on the anode catalyst when the operating pressure is increased.

In the process of the step S6, the system controller 21 reads out target operating pressures for anode operating pressure (anode inlet pressure) and cathode operating pressure (cathode inlet pressure). An increase in the operating pressure increases the concentration of hydrogen, and in this embodiment, the target operating pressure is calculated in advance as such a pressure that the gas circulator 11 can ensure a flow rate of hydrogen to the anode 2a necessary for power generation. The process of the step S6 is thus completed, and the activation process proceeds from the process of the step S6 to a process of step S7.

In the process of the step S7, the system controller 21 increases the anode operating pressure and cathode operating pressure to the target operating pressures (at the time T=T2 in FIG. 3) to increase the concentration of hydrogen in the anode circulation path 9 and reduce a concentration of gas not contributing to power generation. The process of the step S7 is thus completed, and the series of steps of the activation process is finished.

As apparent from the above description, according to the fuel cell system 1 as the first embodiment of the present invention, the system controller 21 supplies hydrogen to the fuel cell stack 2 while driving the gas circulator 11 with the purge valve 12 closed. After a predetermined condition is satisfied, the system controller 21 increases the anode operating pressure and cathode operating pressure to the target operating pressures. With such a configuration, compared to a case where the anode operating pressure is increased in a state where oxygen remains in the anode circulation path 9, the amount of gas mixture of remaining oxygen and hydrogen can be reduced. It is therefore possible to suppress local generation of electric potential and heat due to the reaction of the gas mixture on the anode catalyst and prevent degradation of the components of the fuel cell stack 2.

The remaining oxygen is consumed by the reaction with hydrogen before the anode operating pressure is increased. Accordingly, even when the anode operating pressure is increased, the degradation of the components of the fuel cell stack 2 can be prevented. Furthermore, hydrogen is supplied as much as the remaining oxygen is consumed, and the anode operating pressure is then increased, thus reducing the proportion of gas not contributing to power generation while increasing the proportion of hydrogen. Accordingly, when electricity is taken out according to the load requirement, hydrogen can be supplied to the anode 2a by the gas circulator 11 without running out, and degradation of the components of the fuel cell stack 2 can be thereby prevented. Moreover, hydrogen is not discharged during the activation of the system, thus eliminating the need for dilution equipment and combustion equipment for treating hydrogen and increasing the degree of freedom in the layout of the fuel cell system.

According to the fuel cell system 1 as the first embodiment of the present invention, the system controller 21 increases the anode operating pressure and cathode operating pressure to the target operating pressures after a lapse of the oxygen concentration decreasing time t0 calculated in advance. It is therefore possible to prevent the degradation of the components of the fuel cell stack 2 by means of a simple control.

Figure 4:
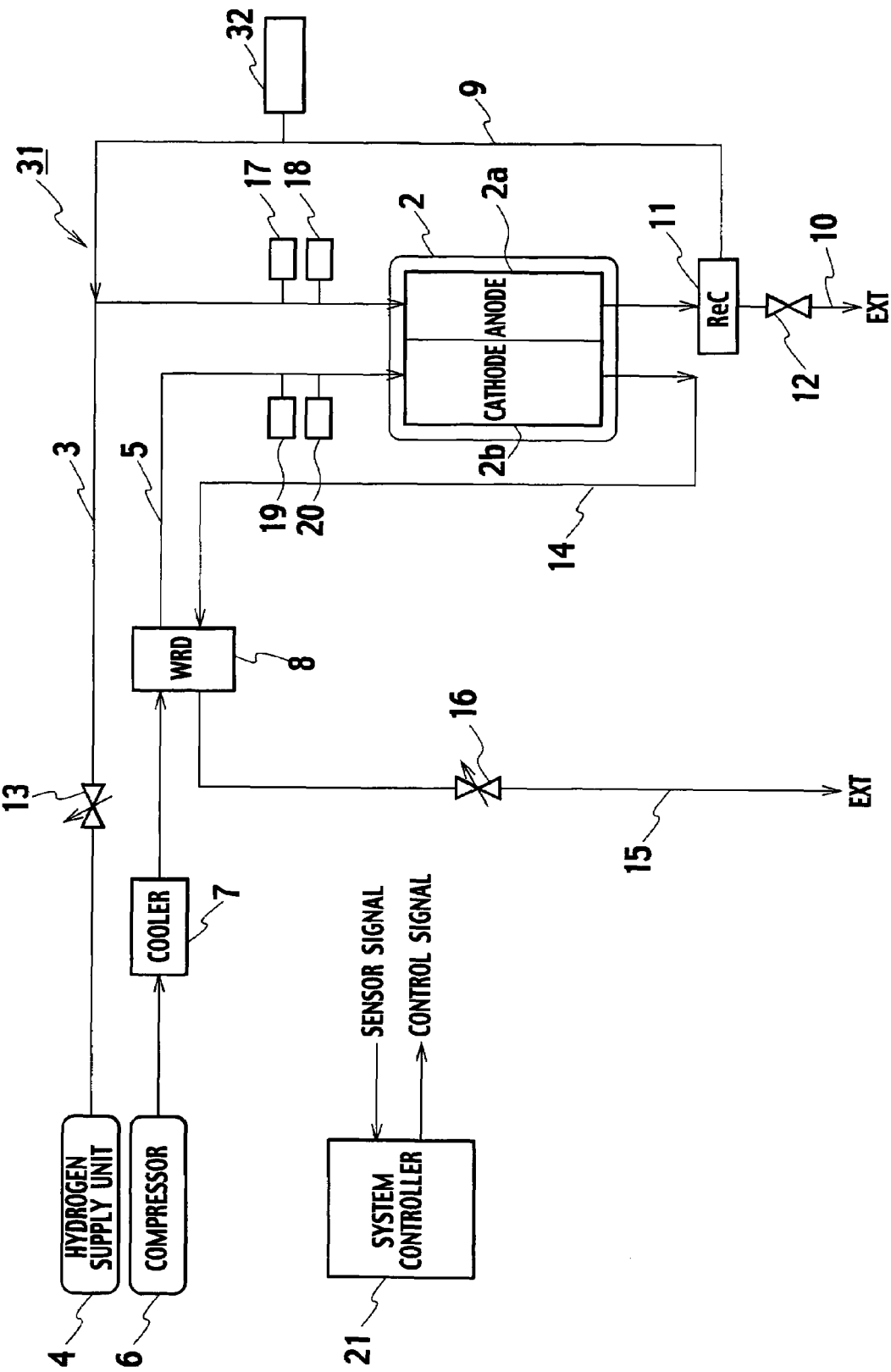
FIG. 4 is a block diagram showing a configuration of a fuel cell system as a second embodiment of the present invention.

As shown in FIG. 4, in addition to the configuration of the fuel cell system 1 as the first embodiment, a fuel cell system 31 as a second embodiment of the present invention includes an oxygen concentration sensor 32 detecting the oxygen concentration in the anode circulation path 9. In the fuel cell system 31, the system controller 21 executes the following activation process to prevent degradation of the components of the fuel cell stack 2 when the anode operating pressure is increased. Hereinafter, a description is given of the system controller 21 executing the activation process with reference to the flowchart shown in FIG. 5.

Figure 5:
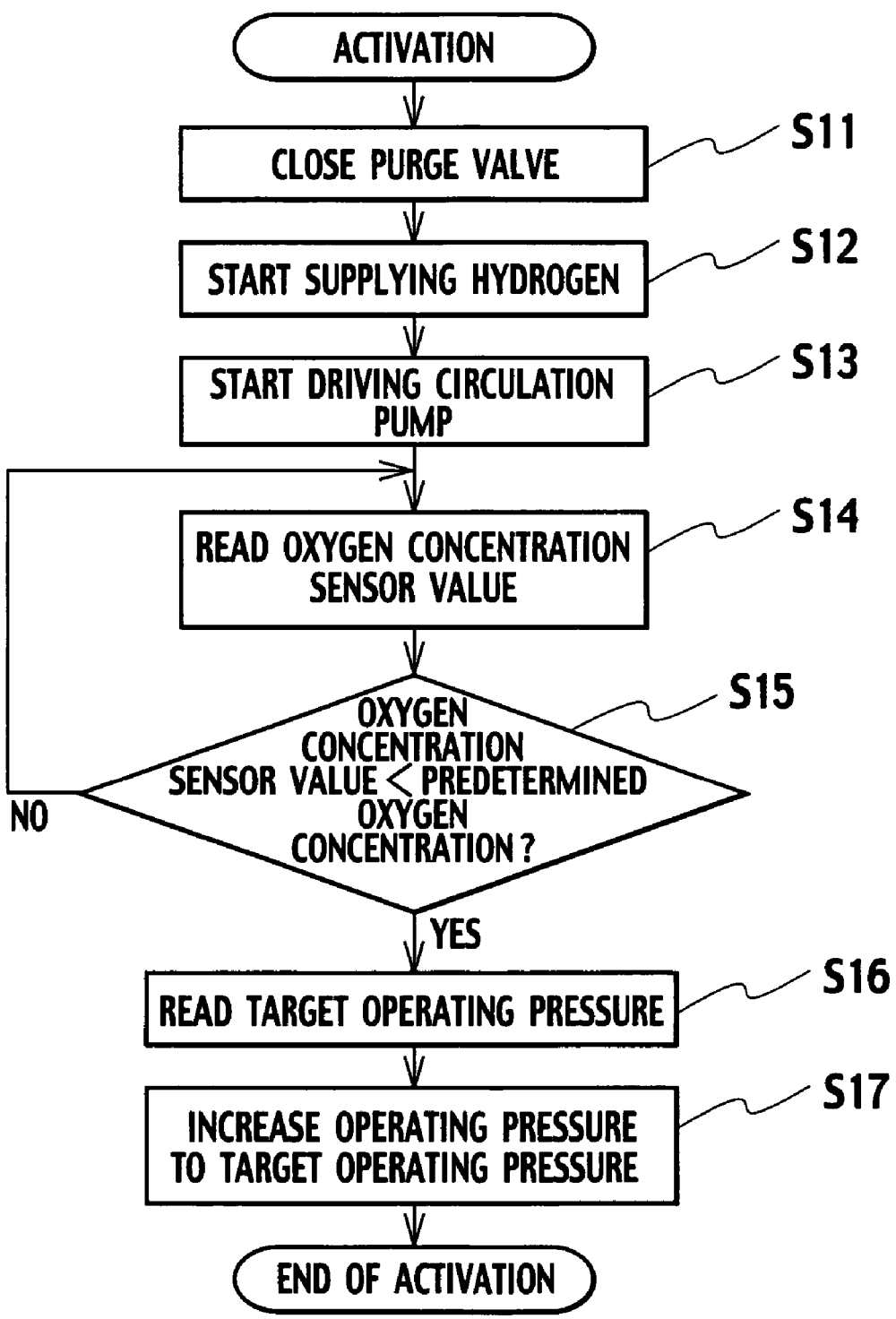
FIG. 5 is a flowchart showing a flow of an activation process by the fuel cell system as the second embodiment of the present invention.

The flowchart shown in FIG. 5 starts upon the instruction to activate the fuel cell system 1 being inputted to the system controller 21, and the activation process proceeds to a process of step S11. Processes of steps S11 to S13, S16, and S17 shown in FIG. 5 are the same as the processes of the steps S1 to S3, S6, and 7 shown in FIG. 2, respectively. The description thereof is therefore omitted below, and processes of only steps S14 and 15 are described.

In the process of the step S14, the system controller 21 reads a value detected by the oxygen concentration sensor 32 to detect the oxygen concentration in the anode circulation path 9. The process of the step S14 is thus completed, and the activation process proceeds from the process of the step S14 to the process of the step S15.

In the process of the step S15, the controller 21 determines whether the oxygen concentration in the anode circulation path 9 is less than a predetermined oxygen concentration. As a result of the determination, when the oxygen concentration in the anode circulation path 9 is not less than the predetermined oxygen concentration, the system controller 21 returns the activation process to the process of the step S14. On the other hand, when the concentration of oxygen in the anode circulation path 9 is less than the predetermined oxygen concentration, the system controller 21 advances the activation process to the process of the step S16.

In this specification, the predetermined oxygen concentration is such an oxygen concentration that degradation of the components of the fuel cell stack 2 due to local generation of electric potential and heat by the chemical reaction of the gas mixture of hydrogen and oxide is not caused when the operating pressure is increased. The predetermined oxygen concentration is calculated in advance based on basic data including experimental data.

As apparent from the above description, according to the fuel cell system 31 as the second embodiment of the present invention, the system controller 21 increases the anode operating pressure after the oxygen concentration in the anode circulation path 9 decreases to such an oxygen concentration that degradation of the components of the fuel cell stack 2 is not caused. It is therefore possible to suppress degradation of the components of the fuel cell stack 2 even when the anode operating pressure is increased.

A fuel cell system as the third embodiment of the present invention has the same configuration as that of the fuel cell system as the second embodiment of the present invention. The system controller 21 executes the following activation process to prevent degradation of the components of the fuel cell stack 2 when the anode operating pressure is increased. Hereinafter, a description is given of an operation of the system controller 21 executing the activation process with reference to a flowchart shown in FIG. 6.

Figure 6:
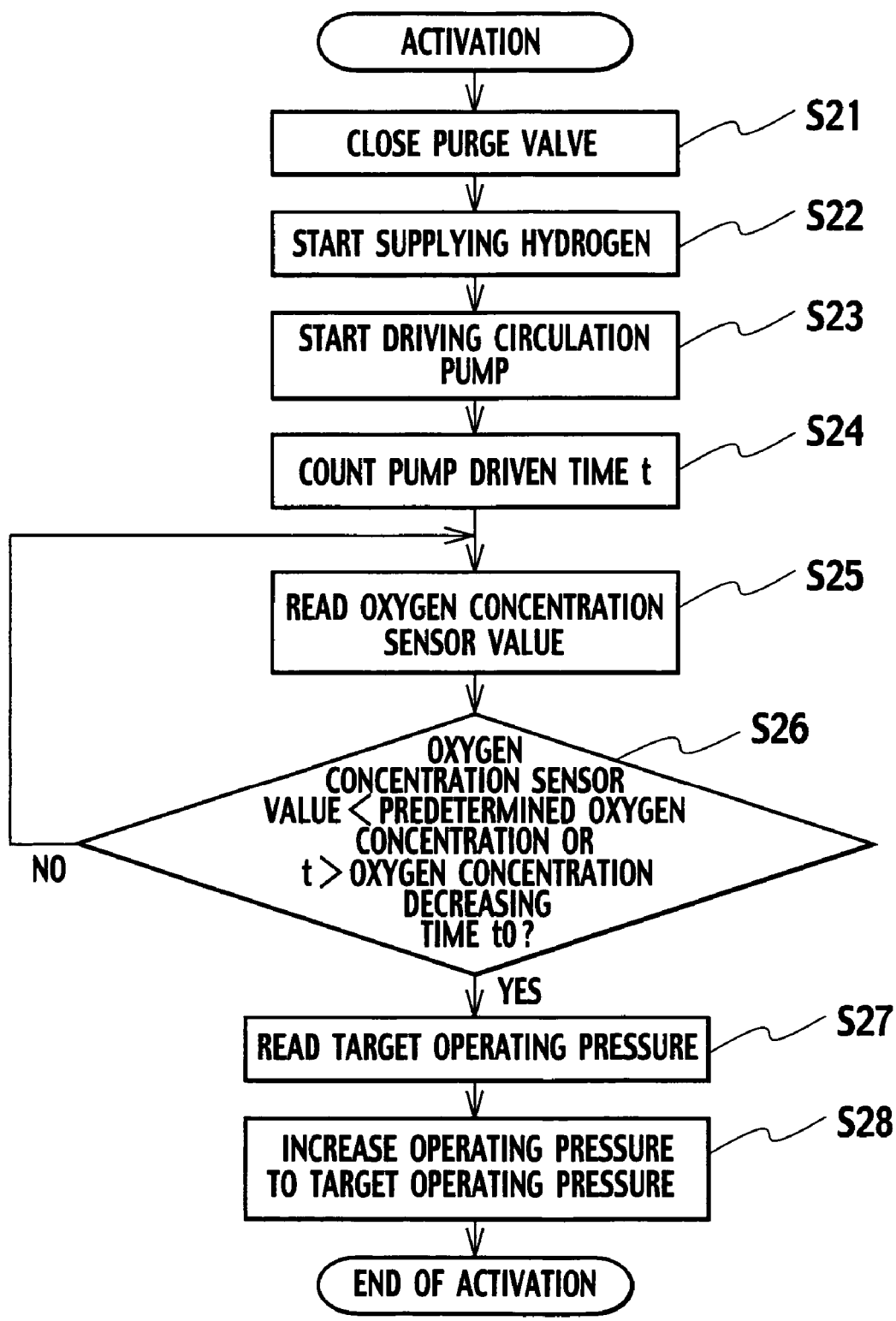
FIG. 6 is a flowchart showing a flow of an activation process by a fuel cell system as a third embodiment of the present invention.

The flowchart shown in FIG. 6 starts upon the instruction to activate the fuel cell system 1 being inputted to the system controller 21, and the activation process proceeds to a process of step S21. Processes of steps S21 to S24, S27, and S28 shown in FIG. 6 are the same as the processes of the steps S1 to S4, S6, and S7, respectively. The description thereof is omitted below, and only processes of steps S25 and S26 are described.

In the process of the step S25, the system controller 21 reads a value detected by the oxygen concentration sensor 32 to read the oxygen concentration in the anode circulation path 9. The process of the step S25 is thus completed, and the activation process proceeds from the process of the step S25 to the process of the step S26.

In the process of the step S26, the system controller 21 determines whether the oxygen concentration in the anode circulation path 9 is less than the predetermined oxygen concentration and whether the pump driven time t is more than the oxygen concentration decreasing time t0. As a result of the determination, when the oxygen concentration in the anode circulation path 9 is not less than the predetermined oxygen concentration and the pump driven time t is not more than the oxygen concentration decreasing time t0, the system controller 21 returns the activation process to the process of the step S25. On the other hand, when the oxygen concentration in the anode circulation path 9 is less than the predetermined oxygen concentration or when the pump driven time t is more than the oxygen concentration decreasing time t0, the system controller 21 advances the activation process to the process of the step S27.

As apparent from the above description, according to the fuel cell system 31 as the third embodiment of the present invention, the system controller 21 increases the anode operating pressure upon the oxygen concentration in the anode circulation path 9 being reduced to the predetermined oxygen concentration or less or upon the pump driven time t reaching the oxygen concentration decreasing time t0 or more. It is therefore possible to prevent degradation of the components of the fuel cell stack 2 even when the anode operating pressure is increased.

Figure 7:
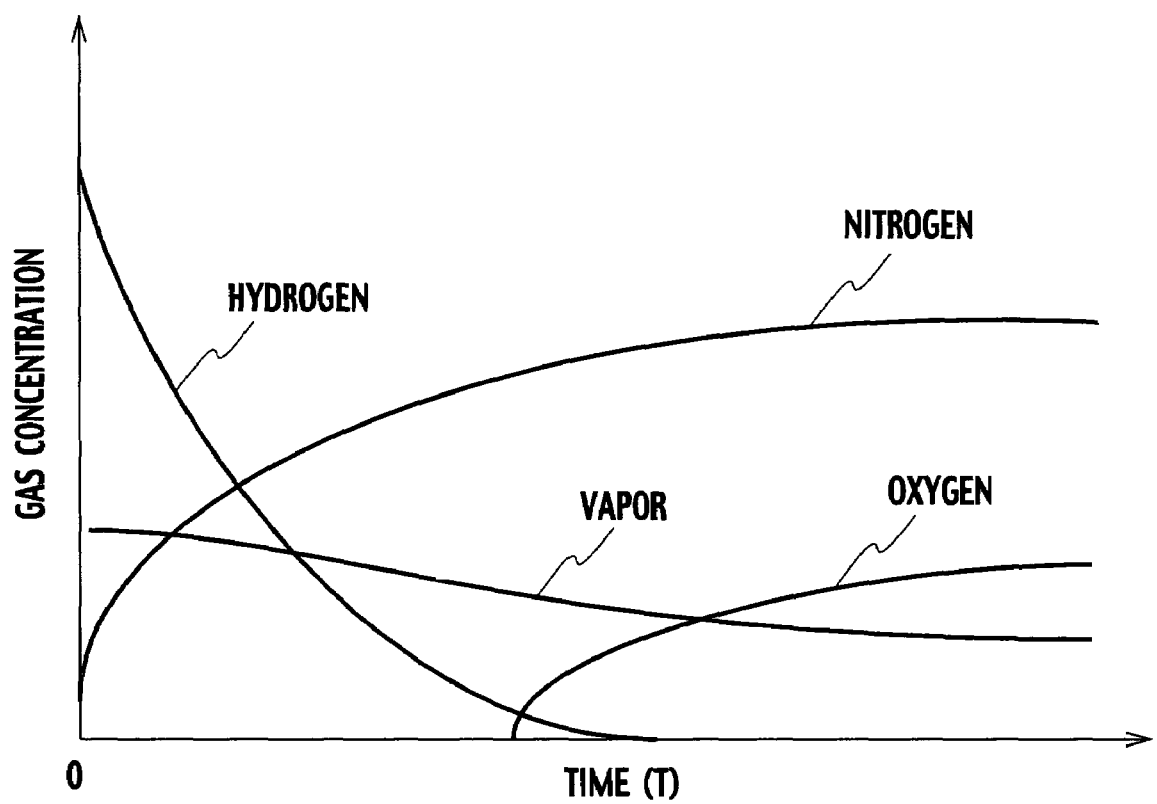
FIG. 7 is a diagram showing temporal change in gas concentration after the fuel cell system stops.

In a general fuel cell system, hydrogen, nitrogen, and vapor are mixed in the anode right after the system is stopped. When hydrogen in the anode is not discharged while the system is stopped, as shown in FIG. 7, the hydrogen concentration in the anode decreases over time because of crossover to the cathode, and on the other hand, the nitrogen concentration increases because of crossover from the cathode. The vapor concentration decreases as the temperature of the anode decreases. Furthermore, the oxygen concentration in the anode does not increase because of the chemical reaction until the hydrogen concentration decreases and increases after the chemical reaction ends. Accordingly, when the system is stopped for a short time, the concentration of oxygen accumulated in the anode remains low. In a fuel cell system as a fourth embodiment of the present invention, therefore, the system controller 21 executes the following activation process to reduce the time required to activate the fuel cell system. Hereinafter, a description is given of an operation of the system controller 21 executing the activation process with reference to a flowchart shown in FIG. 8. The fuel cell system as the fourth embodiment of the present invention has the same configuration as that of the fuel cell system as the first or second embodiment of the present invention.

Figure 8:
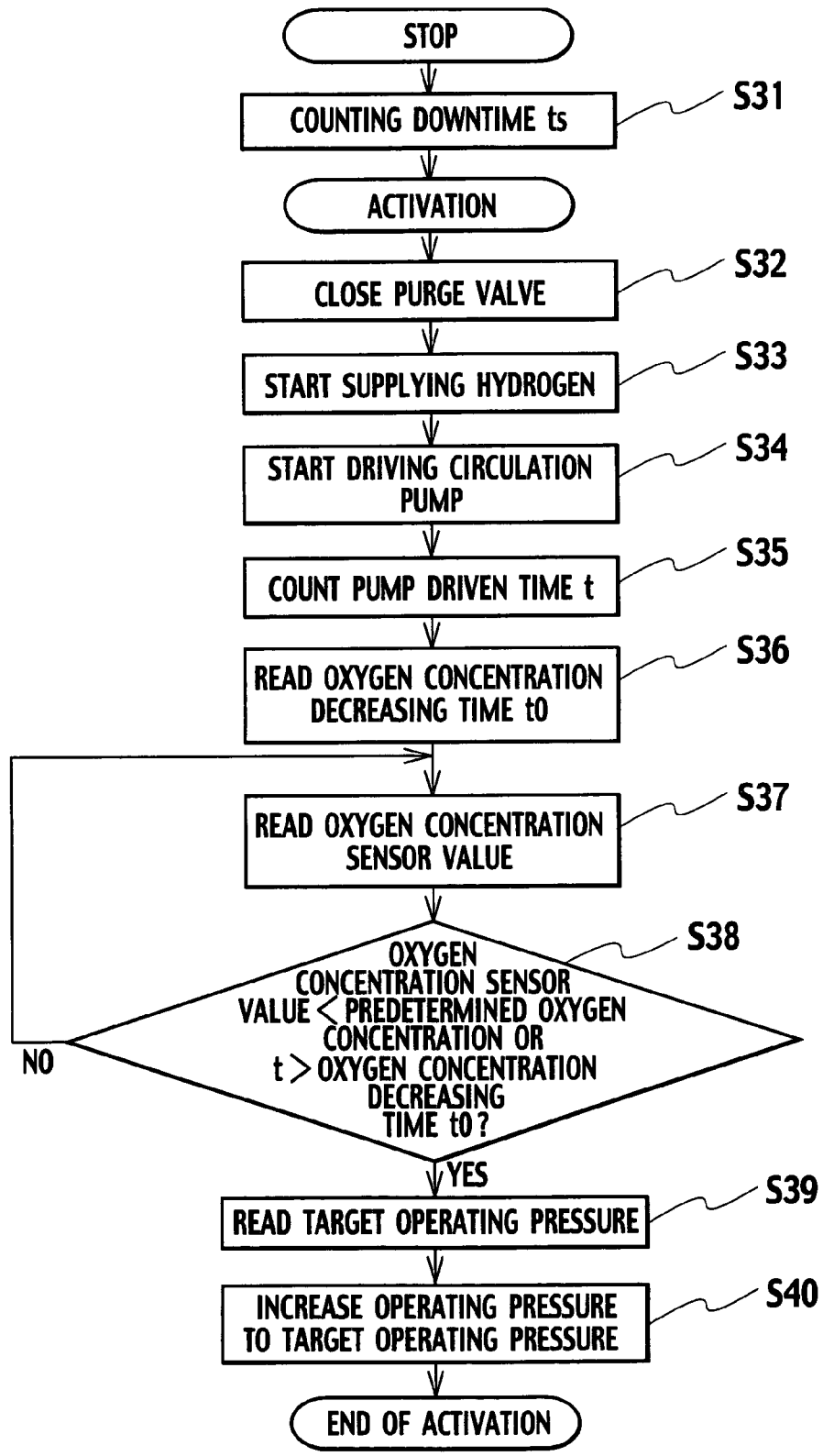
FIG. 8 is a flowchart showing a flow of an activation process by a fuel cell system as a fourth embodiment of the present invention.

The flowchart shown in FIG. 8 starts upon the operation of the fuel cell system being stopped, and the activation process proceeds to a process of step S31. Processes of steps S32 to S35 and S37 to S40 shown in FIG. 8 are the same as the processes of the steps S21 to S24 and S25 to 28 shown in FIG. 6, respectively. The description thereof is therefore omitted below, and only processes of steps S31 and S36 are described.

In the process of the step S31, the system controller 21 counts downtime ts of the fuel cell system. The process of the step S31 is thus completed, and the activation process proceeds from the process of the step S31 to the process of the step S32.

Figure 9:
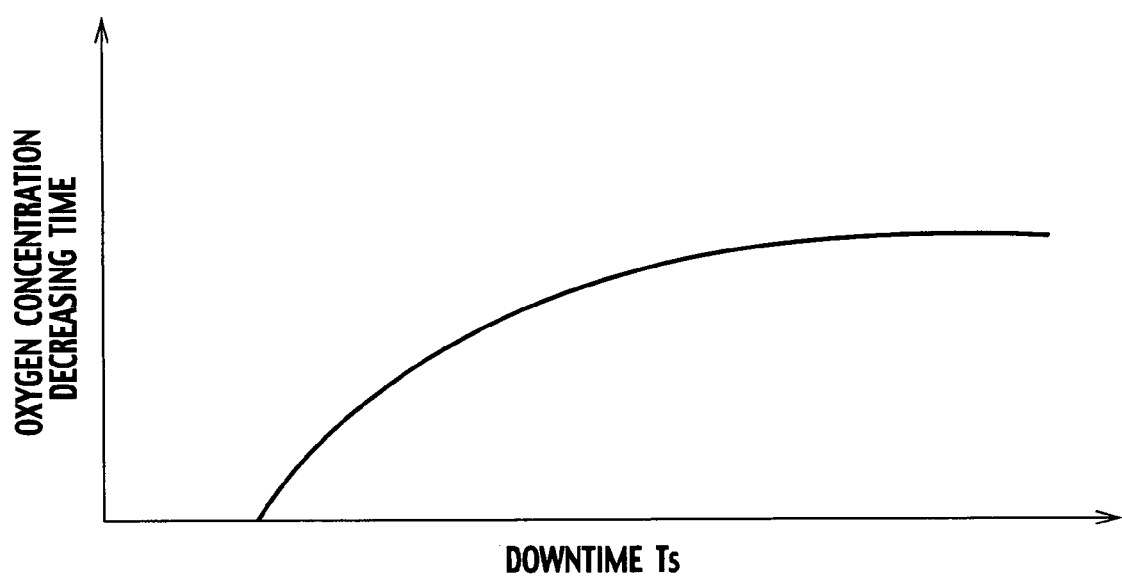
FIG. 9 is a diagram showing a relationship between oxygen concentration decreasing time and system downtime.

In the process of the step S36, referring to a map indicating a relationship between the oxygen concentration decreasing time t0 and the downtime ts shown in FIG. 9, the system controller 21 reads the oxygen concentration decreasing time t0 corresponding to the downtime ts counted in the process of the step S31. The map shown in FIG. 9 is calculated in advance based on the concentration of oxygen accumulated in the anode circulation path 9 according to the downtime of the fuel cell system. The process of the step S36 is thus completed, and the activation process proceeds from the process of the step S36 to the process of the step S37.

As apparent from the above description, according to the fuel cell system as the fourth embodiment of the present invention, the system controller 21 counts the downtime ts of the fuel cell system and adjusts the oxygen concentration decreasing time t0 according to the downtime ts of the fuel cell system. The time required to activate the fuel cell system can be therefore reduced.

In a fuel cell system as a fifth embodiment of the present invention, the system controller 21 executes the following activation process to increase power generation efficiency of the fuel cell system. Hereinafter, a description is given of an operation of the system controller 21 executing the activation process with reference to a flowchart shown in FIG. 10. The fuel cell system as the fifth embodiment of the present invention has the same configuration as that of the fuel cell system as the first or second embodiment of the present invention.

Figure 10:
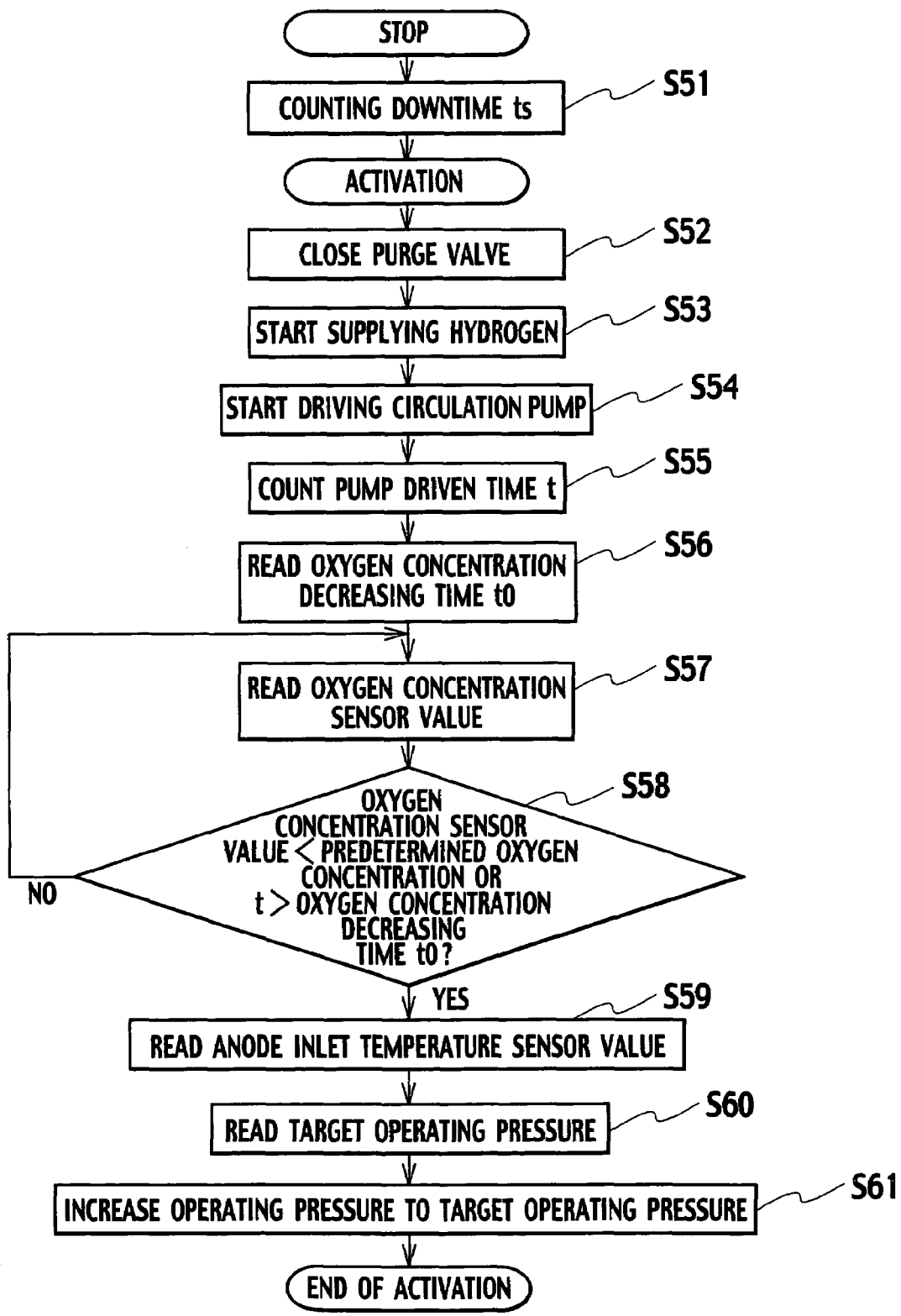
FIG. 10 is a flowchart showing a flow of an activation process by a fuel cell system as a fifth embodiment of the present invention.

The flowchart shown in FIG. 10 starts upon the operation of the fuel cell system being stopped, and the activation process proceeds to a process of step S51. Processes of steps S51 to S58 and S61 shown in FIG. 10 are the same as the processes of the steps S31 to S38 and S40 shown in FIG. 8, respectively. The description thereof is therefore omitted below, and only processes of steps S59 and S60 are described.

In the process of the step S59, the system controller 21 reads a value detected by the anode inlet temperature sensor 18 to detect temperature (anode inlet temperature) of hydrogen supplied to the anode 2a. The process of the step S59 is thus completed, and the activation process proceeds from the process of the step S59 to the process of the step S60.

Figure 11:
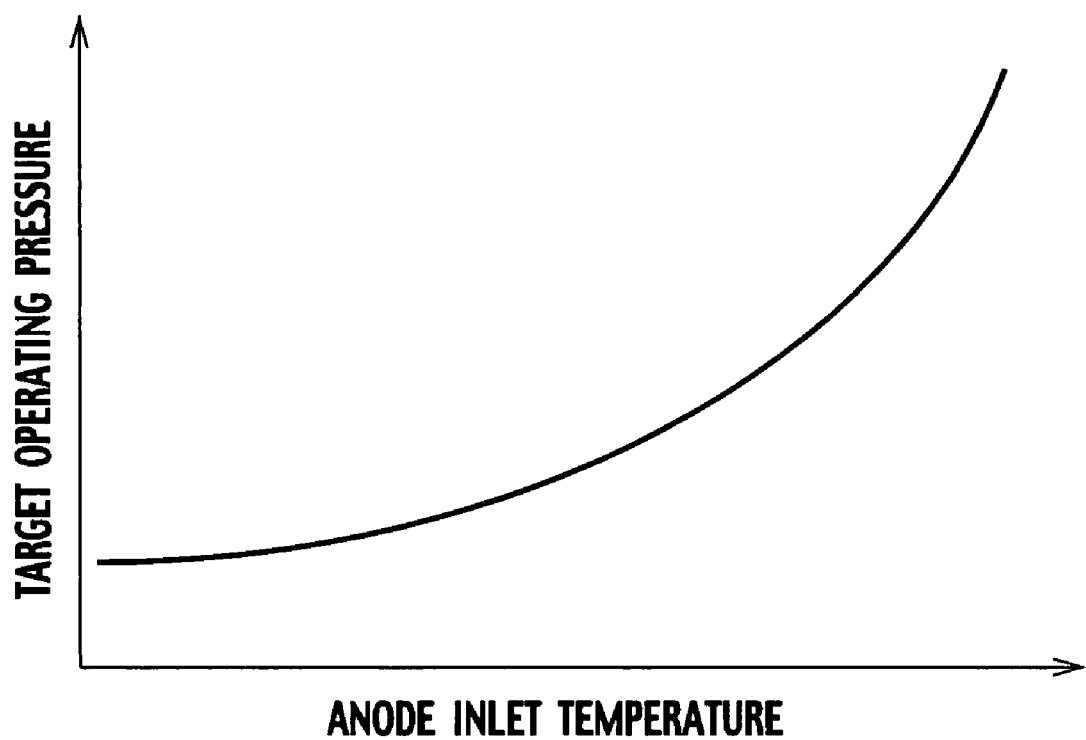
FIG. 11 is a diagram showing a relationship between target operating pressure and anode inlet temperature.

In the process of the step S60, referring to a map indicating a relationship between the target operating pressure and the anode inlet temperature shown in FIG. 11, the system controller 21 reads the target operating pressure corresponding to the anode inlet temperature detected in the process of the step S59. Generally, the lower the anode inlet temperature, the lower the vapor concentration, that is, the lower the proportion of gas component not contributing to power generation of the fuel cell system and moreover the higher the hydrogen concentration. Accordingly, in the map shown in FIG. 11, the target operating pressure allowing the gas circulator 11 to ensure a flow rate of hydrogen necessary for power generation in the anode 2a is smaller at lower anode inlet temperature. The process of the step S60 is thus completed, and the activation process proceeds from the process of the step S60 to the process of the step S61.

As apparent from the above description, according to the fuel cell system as the fifth embodiment of the present invention, the system controller 21 adjusts the target operating pressure according to the anode inlet temperature, thus increasing the power generation efficiency of the fuel cell system. The system controller 21 may adjust the target operating pressure according to the load requirement.

In a fuel cell system as a sixth embodiment of the present invention, the system controller 21 executes the following activation process to suppress degradation of the components of the fuel cell stack 2. Hereinafter, a description is given of an operation of the system controller 21 executing the activation process with reference to a flowchart shown in FIG. 12. The fuel cell system as the sixth embodiment of the present invention has the same configuration as that of the fuel cell system as the first or second embodiment of the present invention, and the description thereof is omitted below.

Figure 12:
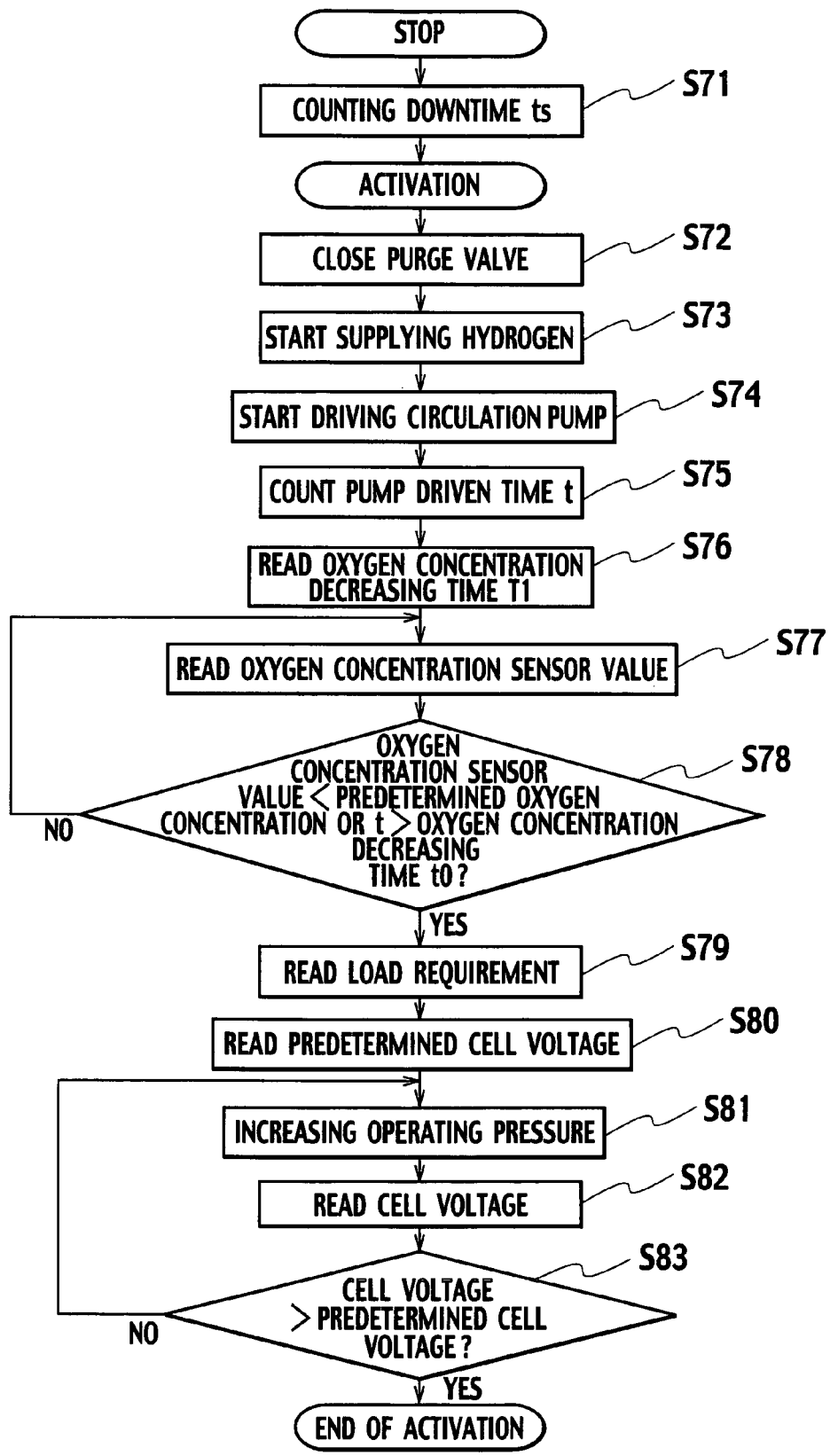
FIG. 12 is a flowchart showing a flow of an activation process by a fuel cell system as a sixth embodiment of the present invention.

The flowchart shown in FIG. 12 starts upon the operation of the fuel cell system being stopped, and the activation process proceeds to a process of step S71. Processes of steps S71 to S78 shown in FIG. 12 are the same as the processes of the steps S31 to S38 shown in FIG. 8, respectively. The description thereof is therefore omitted below, and only processes of step S79 and subsequent steps are described.

In the process of the step S79, the system controller 21 reads the load requirement for the fuel cell system. The process of the step S79 is thus completed, and the activation process proceeds from the process of the step S79 to a process of step S80.

Figure 13:
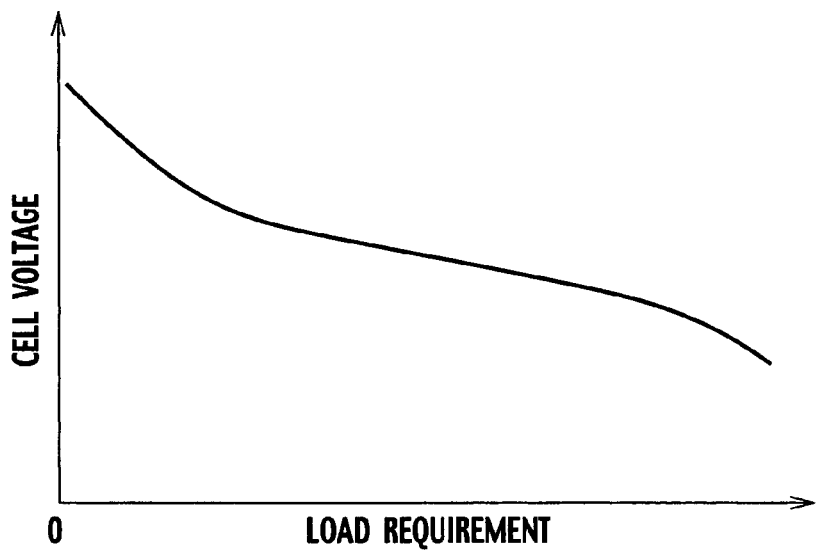
FIG. 13 is a diagram showing a relationship between cell voltage and a load requirement.

In the process of the step S80, referring to a map indicating a relationship between predetermined cell voltage and the load requirement shown in FIG. 13, the system controller 21 reads a predetermined cell voltage corresponding to the load requirement read in the process of the step S79. In the map shown in FIG. 13, the predetermined cell voltage is set to a voltage larger than such a value that degradation of the fuel cell stack is not caused even when electricity corresponding to the load requirement is taken out from the fuel cell system. The predetermined cell voltage is calculated in advance based on the IV characteristic of the fuel cell stack. The process of the step S80 is thus completed, and the activation process proceeds from the process of the step S80 to a process of step S81.

In the process of the step S81, the system controller 21 increases the anode operating pressure and cathode operating pressure. The process of the step S81 is thus completed, and the activation process proceeds from the process of the step S81 to a process of step S82.

In the process of the step S82, the system controller 21 reads a cell voltage of the fuel cell stack 2. The process of the step S82 is thus completed, and the activation process proceeds from the process of the step S82 to a process of step S83.

In the process of the step S83, the system controller 21 determines whether the cell voltage read in the process of the step S82 is more than the predetermined cell voltage read in the process of the step S80. As a result of the determination, when the cell voltage is not more than the predetermined cell voltage, the system controller 21 returns the activation process to the process of the step S81. On the other hand, when the cell voltage is more than the predetermined cell voltage, the system controller 21 terminates the series of steps of the activation process.

As apparent from the above description, according to the fuel cell system as the sixth embodiment of the present invention, the system controller 21 adjusts the target operating pressure according to the cell voltage of the fuel cell stack 2. With such a configuration, hydrogen can be supplied to the anode 2b by the gas circulator 11 without running out, and degradation of the components of the fuel cell stack 2 can be suppressed. The aforementioned process may be carried out utilizing, instead of the cell voltage, total voltage of the fuel cell stack 2.

It is generally known that the catalyst used in the fuel cell stack causes a decrease in activity when left at a high voltage and causes performance degradation of the fuel cell stack. However, the fuel cell stack has a property in which the higher the electrode potential the smaller the load current. During the activation, a small amount of reaction gas is supplied to each electrode, and high potential due to generation of minute electrical current could be applied to the catalyst. To prevent performance degradation of the fuel cell stack, therefore, it is necessary to avoid this high voltage state immediately. In a fuel cell system as a seventh embodiment of the present invention, the system controller 21 executes the following activation process to prevent performance degradation of the fuel cell stack. Hereinafter, a description is given of an operation of the system controller 21 executing the activation process with reference to a flowchart shown in FIG. 14. The fuel cell system as the seventh embodiment of the present invention has the same configuration as that of the fuel cell system as the first or second embodiment of the present invention, and the description thereof is omitted below.

Figure 14:
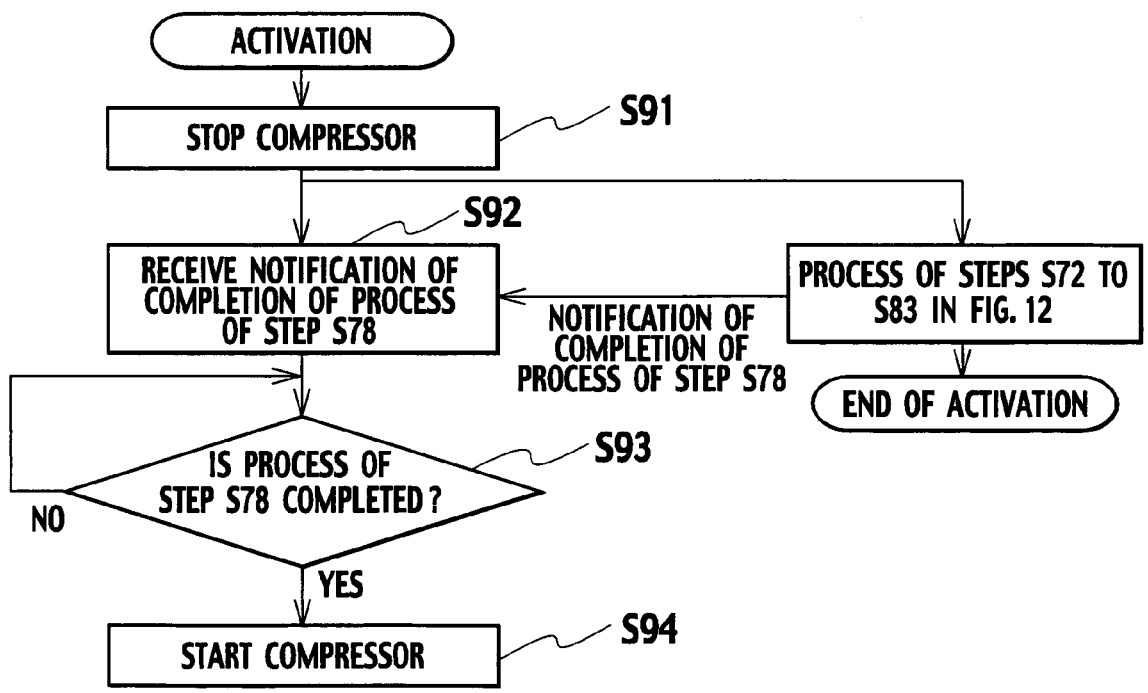
FIG. 14 is a flowchart showing a flow of an activation process by a fuel cell system as a seventh embodiment of the present invention.

The flowchart shown in FIG. 14 starts upon the instruction to activate the fuel cell system 1 being inputted to the system controller 21, and the activation process proceeds to a process of step S91.

In the process of the step S91, the system controller 21 prohibits an operation of the compressor 6. The process of the step S91 is thus completed, and the activation process proceeds from the process of the step S91 to a process of step S92.

In the process of the step S92, the system controller 21 executes the processes of the steps S72 to S83 shown in FIG. 12 and advances the activation process to a process of step S93 at the same time as the process of the step S78 is completed.

In the process of the step S93, the system controller 21 determines whether the process of the step S78 shown in FIG. 12 is completed. As a result of the determination, upon completion of the process of the step S78, the system controller 21 advances the activation process to a process of step S94.

In the process of the step S94, the system controller 21 removes the prohibition of the operation of the compressor 6. The process of the step S94 is thus completed, and the series of steps of the activation process is completed.

As apparent from the above description, according to the fuel cell system as the seventh embodiment of the present invention, the system controller 21 prohibits the operation of the compressor 6 until just before increasing the anode operating pressure and cathode operating pressure to the target operating pressures. This allows the concentration of oxygen remaining in the cathode 2b to be reduced, thus reducing the voltage of the fuel cell stack 2 generated during unloaded power generation. It is therefore possible to prevent the performance degradation of the fuel cell stack due to the decrease in activity of the catalyst used in the fuel cell stack caused by leaving the catalyst at a high voltage.

In a fuel cell system as an eighth embodiment of the present invention, the system controller 21 executes the following activation process to prevent degradation of the components of the fuel cell stack 2. Hereinafter, a description is given of an operation of the system controller 21 executing the activation process with reference to a flowchart shown in FIG. 15. The fuel cell system as the eighth embodiment of the present invention has the same configuration as that of the fuel cell system as the first or second embodiment of the present invention, and the description thereof is omitted below.

Figure 15:
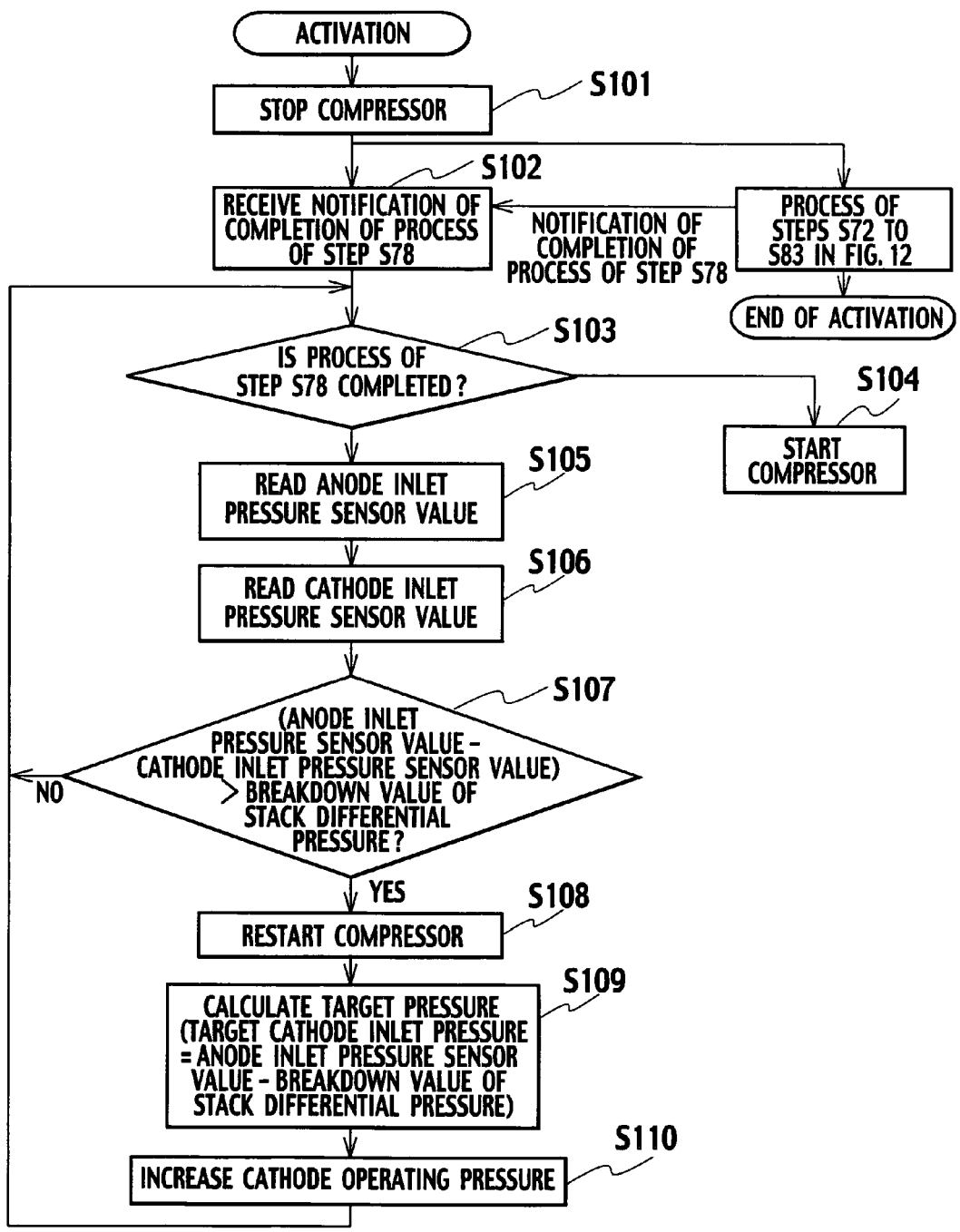
FIG. 15 is a flowchart showing a flow of an activation process by a fuel cell system as an eighth embodiment of the present invention.

The flowchart shown in FIG. 15 starts upon the fuel cell system being stopped, and the activation process proceeds to a process of step S101. The process of the step S101 and a process of step S102 shown in FIG. 15 are the same as the processes of the steps S91 and S92 shown in FIG. 14, respectively. The description thereof is therefore omitted below, and only processes of step S103 and subsequent steps are described.

In the process of the step S103, the system controller 21 determines whether the process of the step S78 shown in FIG. 12 is completed. As a result of the determination, when the process of the step S78 is not completed, the system controller 21 advances the activation process to a process of step S105. On the other hand, when the process of the step S78 is completed, the system controller advances the activation process to a process of step S104.

In the process of the step S104, the system controller 21 removes the prohibition of the operation of the compressor 6. The process of the step S104 is thus completed, and the series of steps of the activation process is completed.

In the process of the step S105, the system controller 21 reads the value detected by the anode inlet pressure sensor 17 to detect pressure (anode inlet pressure) of hydrogen supplied to the anode 2a. The process of the step S105 is thus completed, and the activation process proceeds from the process of the step S105 to a process of step S106.

In the process of the step S106, the system controller 21 reads a value detected by the cathode inlet pressure sensor 19 to detect pressure (cathode inlet pressure) of air supplied to the cathode 2b. The process of the step S106 is thus completed, and the activation process proceeds from the process of the step S106 to a process of step S107.

In the process of the step S107, the system controller 21 calculates a difference between the anode inlet pressure and cathode inlet pressure and then determines whether the calculated difference is more than a breakdown value of the differential pressure between the anode 2a and cathode 2b. When the difference is not more than the breakdown value as a result of determination, the system controller 21 returns the activation process to the process of the step S103. On the other hand, when the difference is more than the breakdown pressure, the system controller 21 advances the activation process to a process of step S108.

In the process of the step S108, the system controller 21 removes the prohibition of the operation of the compressor 6. The process of the step S108 is thus completed, and the activation process proceeds from the process of the step S108 to a process of step S109.

In the process of the step S109, as a target value of the cathode inlet pressure, the system controller 21 calculates a value obtained by subtracting the anode inlet pressure from the breakdown pressure. The process of the step S109 is thus completed, and the activation process proceeds from the process of the step S109 to a process of step S110.

In the process of the step S110, the system controller 21 increases the cathode operating pressure to the target value calculated in the process of the step S109. These processes can prevent the difference between the anode inlet pressure and cathode inlet pressure from increasing to the breakdown pressure or more and thereby prevent damage of the fuel cell stack. The process of the step S110 is thus completed, and the activation process returns from the process of the step S110 to the process of the step S103.

As apparent from the above description, according to the fuel cell system as the eighth embodiment of the present invention, the system controller 21 prevents the difference between the anode inlet pressure and cathode inlet pressure from reaching the breakdown pressure of the fuel cell stack or more while reducing the amount of oxygen remaining in the anode circulation path 9. It is therefore possible to prevent the degradation of the components of the fuel cell stack 2.

Figure 16:
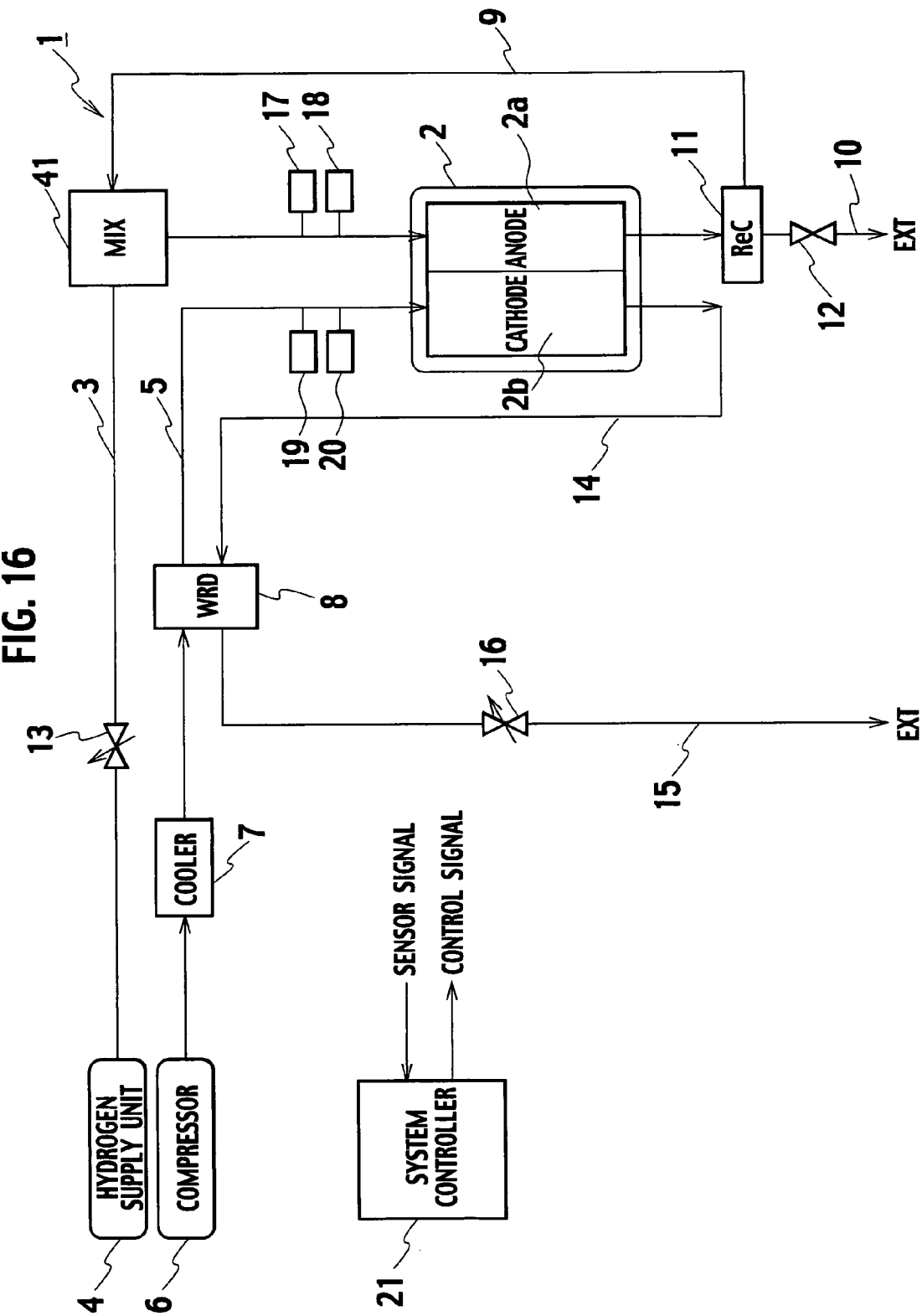
FIG. 16 is a block diagram showing a configuration of a fuel cell system as a ninth embodiment of the present invention.
Figure 17:
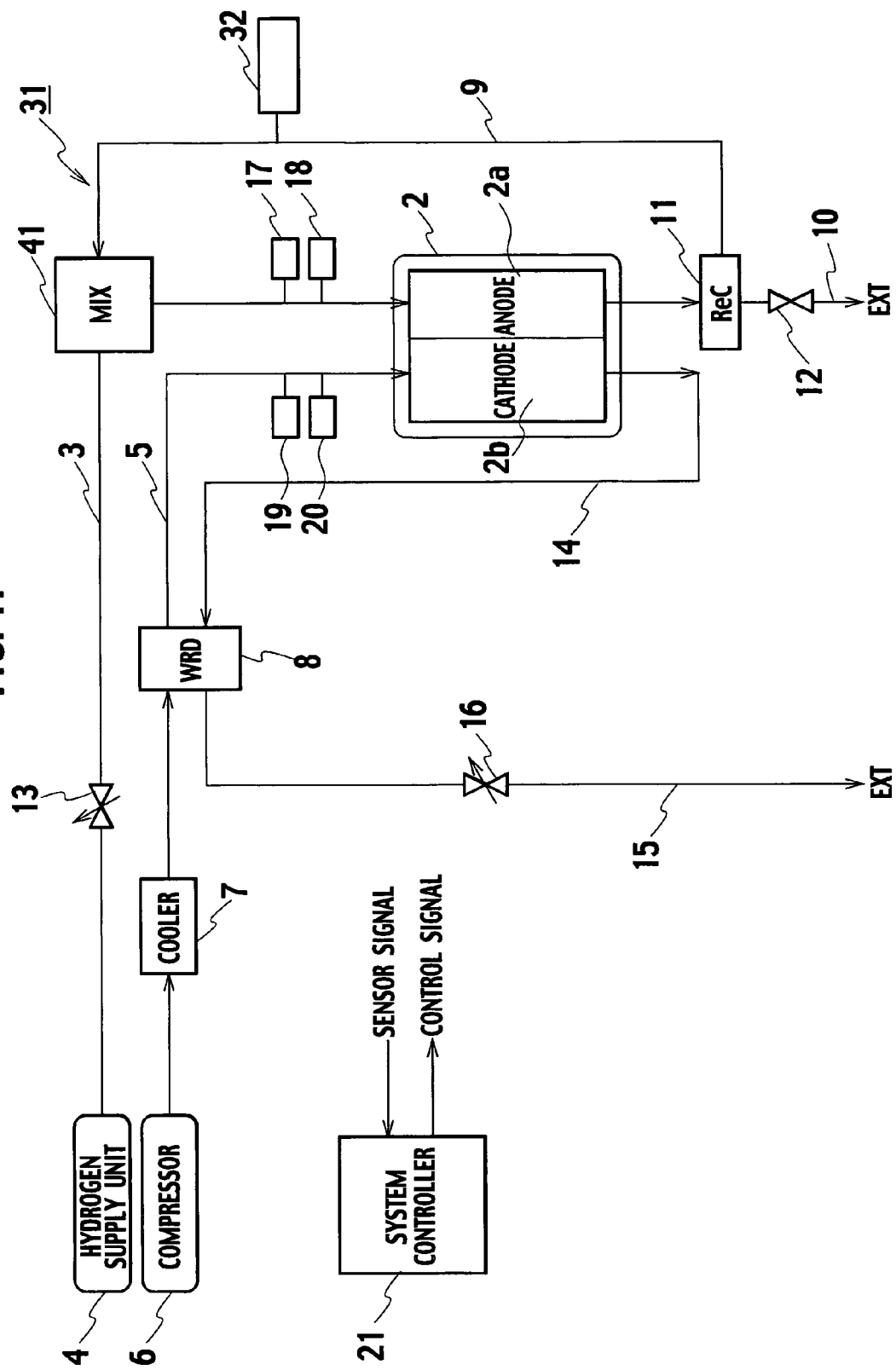
FIG. 17 is a block diagram showing a configuration of another fuel cell system as the ninth embodiment of the present invention.

As shown in FIGS. 16 and 17, in the fuel cell system as the first or second embodiment, a fuel cell system as a ninth embodiment of the present invention further includes a mixer 41. The mixer 41 uniformly mixes hydrogen supplied through the hydrogen supply pipe 3 and the anode off gas supplied through the anode circulation path 9 and supplies the mixed gas to the anode 2a. According to this fuel cell system, the reaction of the gas mixture proceeds uniformly on the anode catalyst. It is therefore possible to suppress local generation of electric potential and heat on the anode catalyst and suppress the degradation of the components of the fuel cell stack.

Figure 18:
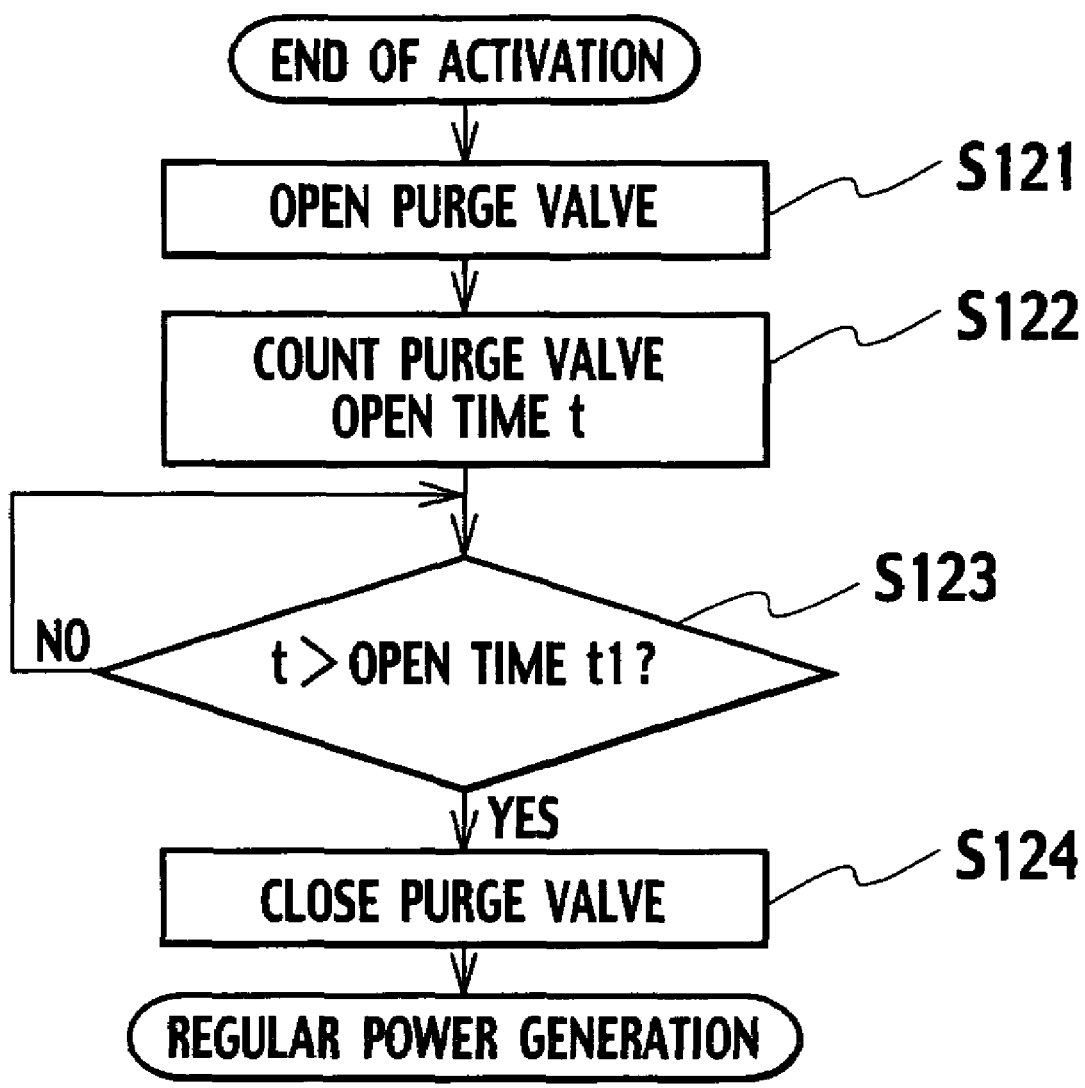
FIG. 18 is a flowchart showing a flow of a control process by a fuel cell system as a tenth embodiment of the present invention.
Figure 19:
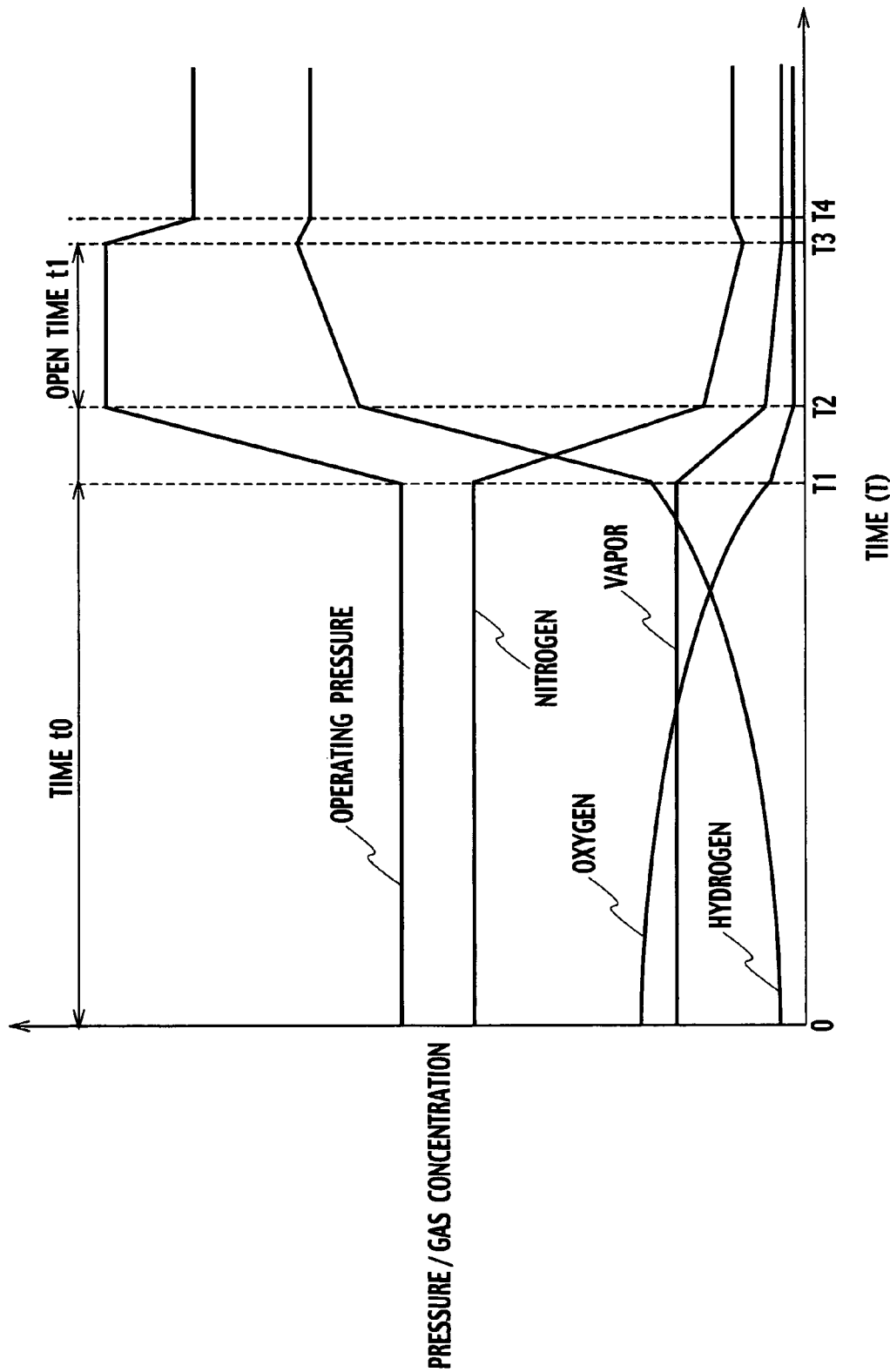
FIG. 19 is a diagram showing temporal change in the proportions of gas components and operating pressure in the anode circulation path during the control process shown in FIG. 18.

A fuel cell system as a tenth embodiment of the present invention has the same configuration as that of the fuel cell system as the first, second, or ninth embodiment of the present invention. The controller 21 executes the following control process after the activation process to suppress degradation of the components of the fuel cell stack 2. Hereinafter, with reference to FIGS. 18 and 19, a description is given of an operation of the system controller 21 executing this control process. FIG. 18 shows a control flow of the system controller 21, and FIG. 19 shows temporal change in proportions of the gas components and the operating pressure in the anode circulation path 9 during the control process.

The flowchart shown in FIG. 18 starts upon the completion of the activation process (at the time T=T2 in FIG. 19), and the control process proceeds to a process of step S121.

In the process of the step S121, the system controller 21 opens the purge valve 12 to discharge the anode off gas through the exhaust pipe 10. The process of the step S121 is thus completed, and the control process proceeds from the process of the step S121 to a process of step S122.

In the process of the step S122, the system controller 21 starts counting open time t of the purge valve 12. The process of the step S122 is thus completed, and the control process proceeds from the process of the step S122 to a process of step S123.

In the process of the step S123, the system controller 21 determines whether the open time t of the purge valve 12 is less than a predetermined open time t1. Upon the open time t becoming the predetermined open time t1 or more (at the time T=T3 in FIG. 19), the system controller 21 advances the control process to a process of step S124.

Figure 20:
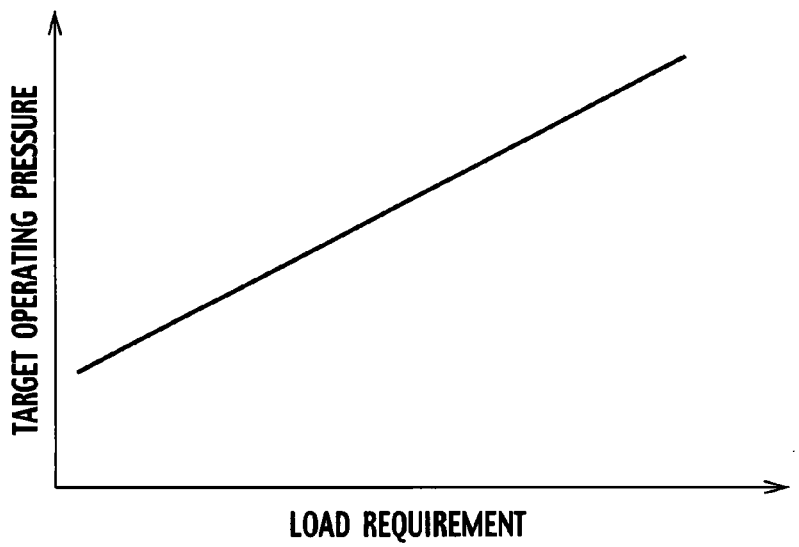
FIG. 20 is a diagram showing a relationship between the target operating pressure and load requirement.

In the process of the step S124, the system controller 21 closes the purge valve 12 to prohibit discharge of the anode off gas through the exhaust pipe 10. The process of the step S124 is thus completed, and the series of steps of the control process is completed. After the time T=T4 in FIG. 19, referring to a map indicating the relationship between the target operating pressure and load requirement shown in FIG. 20, the system controller 21 controls the operating pressure according to the load requirement and executes a regular power generation process.

As apparent from the above description, in the fuel cell system as the tenth embodiment of the present invention, the system controller 21 increases the anode operating pressure and cathode operating pressure to the target operating pressures and then opens the purge valve 12 for the predetermined time t1 with the cathode operating pressure and anode operating pressure maintained at the target operating pressures. Thereafter, the system controller 21 adjusts the operating pressures according to the load requirement. With such a configuration, the proportion of the gas component staying in the anode 2a and not contributing to power generation can be reduced. Accordingly, even when the operating pressure is changed according to the load requirement after the purge valve 12 is closed, hydrogen can be supplied to the anode 2a by the gas circulator 11 without running out, and the degradation of the components of the fuel cell stack 2 can be suppressed.

Figure 21:
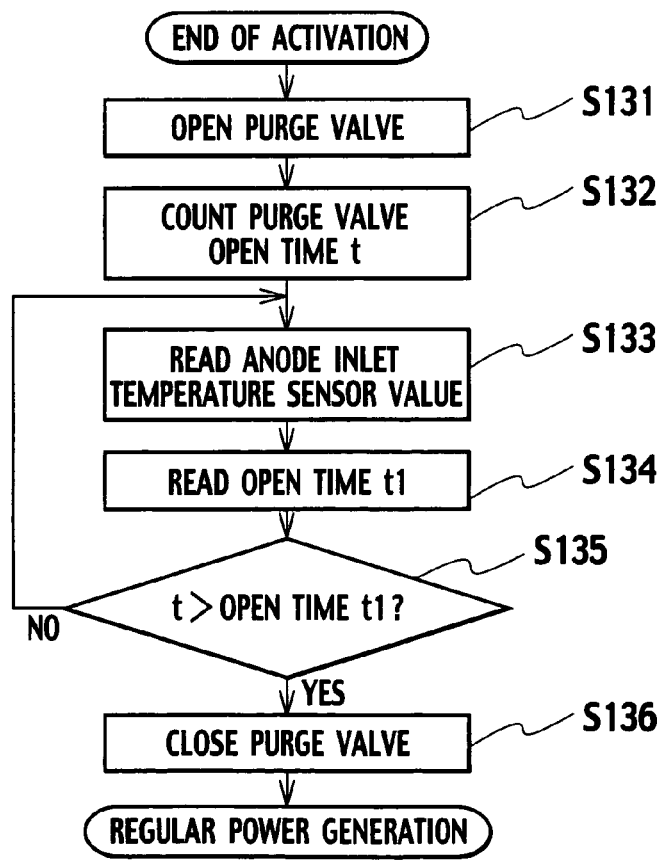
FIG. 21 is a flowchart showing a flow of a control process by a fuel cell system as an eleventh embodiment of the present invention.

A fuel cell system as an eleventh embodiment of the present invention has the same configuration as that of the fuel cell system as the first, second, or ninth embodiment of the present invention. The system controller 21 executes the following control process after the activation process to increase the power generation efficiency of the fuel cell system. Hereinafter, a description is given of an operation of the system controller 21 executing the control process with reference to a flowchart shown in FIG. 21. Processes of steps S131 and S132 shown in FIG. 21 are the same as those of the steps S121 and 122 shown in FIG. 18, respectively. The description thereof is therefore omitted below, and only processes of step S133 and subsequent steps are described.

In the process of the step S133, the system controller 21 reads a value detected by the anode inlet temperature sensor 18 to detect temperature (anode inlet temperature) of hydrogen supplied to the anode 2a. The process of the step S133 is thus completed, and the control process proceeds from the process of the step S133 to a process of step S134.

Figure 22:
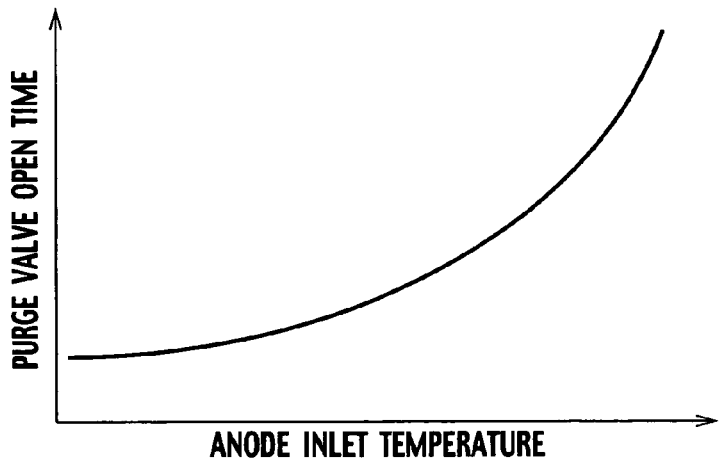
FIG. 22 is a diagram showing a relationship between open time of a purge valve and anode inlet temperature.

In the process of the step S134, with reference to a map indicating a relationship between the open time t1 of the purge valve 12 and the anode inlet temperature as shown in FIG. 22, the system controller 21 reads the open time t1 corresponding to the anode inlet temperature detected in the process of the step S133. Generally, the lower the anode inlet temperature, the higher the vapor concentration, that is, the higher the proportion of the gas component not contributing to power generation of the fuel cell system and moreover the higher the hydrogen concentration. Accordingly, in the map shown in FIG. 22, the open time of the purge valve 12 is calculated in advance as such a value that a flow rate of hydrogen to the anode 2a necessary for power generation can be ensured by the gas circulator 11 even when the open time is reduced to the value. The process of the step S134 is thus completed, and the control process proceeds from the process of the step S134 to a process of step S135.

In the process of the step S135, the system controller 21 determines whether the open time t of the purge valve 12 is less than the open time t1 read in the process of the step S134. As a result of the determination, when the open time t is less than the open time t1, the system controller 21 returns the control process to the process of the step S133. On the other hand, when the open time t is not less than the open time t1, the system controller 21 advances the control process to a process of step S136.

In the process of the step S136, the system controller 21 closes the purge valve 12 to prohibit discharge of the anode off gas through the exhaust pipe 10. The process of the step S136 is thus completed, and the series of steps of the control process is completed. The system controller 21 then executes the regular power generation process.

As apparent from the above description, according to the fuel cell system as the eleventh embodiment of the present invention, the system controller 21 adjusts the open time of the purge valve 12 according to the anode inlet temperature. It is therefore possible to suppress the amount of hydrogen discharged to the outside and increase the power generation efficiency of the fuel cell system.

Figure 23:
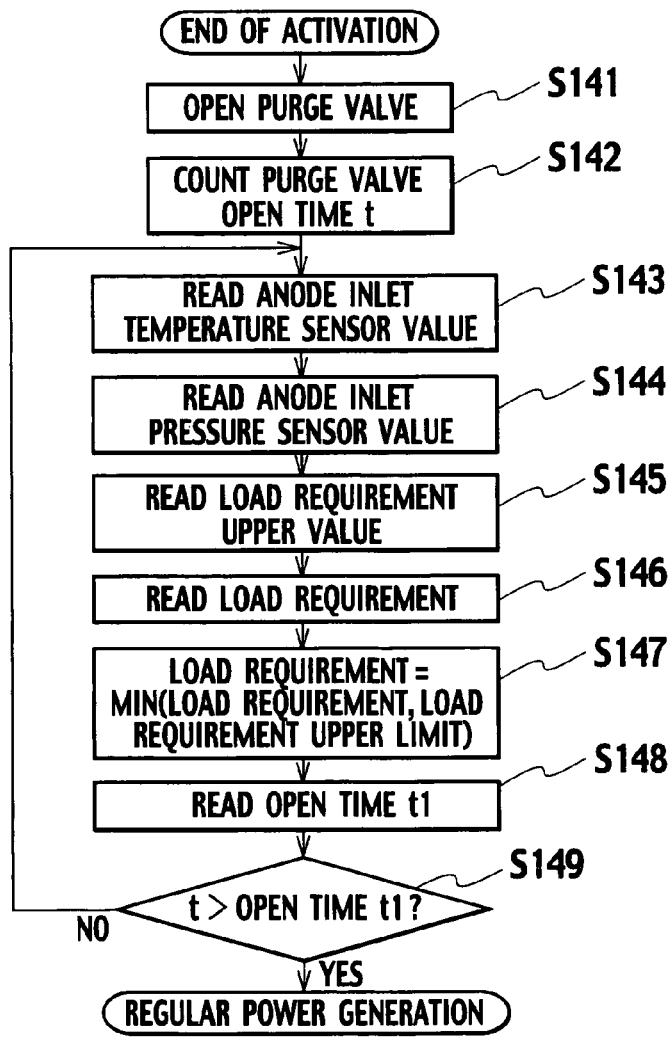
FIG. 23 is a flowchart showing a flow of a control process by a fuel cell system as a twelfth embodiment of the present invention.

A fuel cell system as a twelfth embodiment of the present invention has the same configuration as that of the fuel cell system as the first, second, or ninth embodiment of the present invention. The controller 21 executes the following control process after the Activation process to increase the efficiency of the fuel cell system. Hereinafter, a description is given of an operation of the system controller 21 executing the control process with reference to a flowchart shown in FIG. 23. Processes of steps S141 and S142 shown in FIG. 23 are the same as those of the steps S121 and 122 shown in FIG. 18, respectively. The description thereof is therefore omitted below, and only processes of step S143 and subsequent steps are described.

In the process of the step S143, the system controller 21 reads the value detected by the anode inlet temperature sensor 18 to detect the temperature (anode inlet temperature) of hydrogen supplied to the anode 2a. The process of the step S143 is thus completed, and the control process proceeds from the process of the step S143 to a process of step S144.

In the process of the step S144, the system controller 21 reads the value detected by the anode inlet pressure sensor 17 to detect pressure (anode inlet pressure) of hydrogen supplied to the anode 2a. The process of the step S144 is thus completed, and the control process proceeds from the process of the step S144 to a process of step S145.

Figure 24:
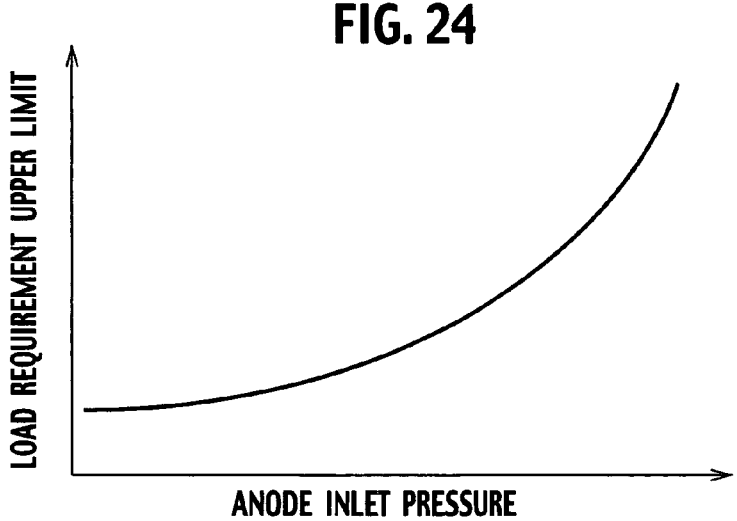
FIG. 24 is a diagram showing a relationship between an upper limit of the load requirement and anode inlet pressure.

In the process of the step S145, referring to a map indicating a relationship between an upper limit of the load requirement and the anode inlet pressure shown in FIG. 24, the system controller 21 reads the upper limit of the load requirement corresponding to the anode inlet pressure detected in the process of the step S144. Generally, the lower the anode inlet pressure, the lower the hydrogen concentration. Accordingly, when the load requirement is large, the gas circulator 11 cannot ensure the amount of hydrogen necessary for power generation. In the map shown in FIG. 24, an amount of hydrogen which can be supplied to the anode 2a is calculated based on the hydrogen concentration according to the anode inlet pressure and the flow rate performance of the gas circulator 11, and the upper limit of the load requirement is set in terms of the anode inlet pressure. The process of the step S145 is thus completed, and the control process proceeds from the process of the step S145 to a process of step S146.

In the process of the step S146, the system controller 21 reads the load requirement for the fuel cell system. The process of the step S146 is thus completed, and the control process proceeds from the process of the step S146 to a process of step S147.

In the process of the step S147, the system controller 21 sets the load requirement to the smaller one of the upper limit of the load requirement read in the process of the step S145 and the load requirement read in the process of the step S146. The process of the step S147 is thus completed, and the control process proceeds from the process of the step S147 to a process of a step S148.

In the process of the step S148, referring to a map indicating a relationship between the open time t1 of the purge valve 12 and the anode inlet temperature shown in FIG. 22, the system controller 21 reads the open time t1 corresponding to the anode inlet temperature detected in the process of the step S143. The process of the step S148 is thus completed, and the control process proceeds from the process of the step S148 to a process of step S149.

In the process of the step S149, the system controller 21 determines whether the open time t of the purge valve 12 is more than the open time t1 read in the process of the step S148. As a result of the determination, when the open time t is not more than the open time t1, the system controller 21 returns the control process to the process of the step S143. On the other hand, when the open time t is more than the open time t1, the system controller 21 terminates the series of steps of the control process and executes the regular power generation process.

As apparent from the above description, according to the fuel cell system as the twelfth embodiment of the present invention, the system controller limits the output of the fuel cell stack according to the operating pressure while the purge valve 12 is opened. It is therefore possible to avoid shortage of hydrogen supplied to the anode 2a and prevent the degradation of the components of the fuel cell stack 2.

Figure 25:
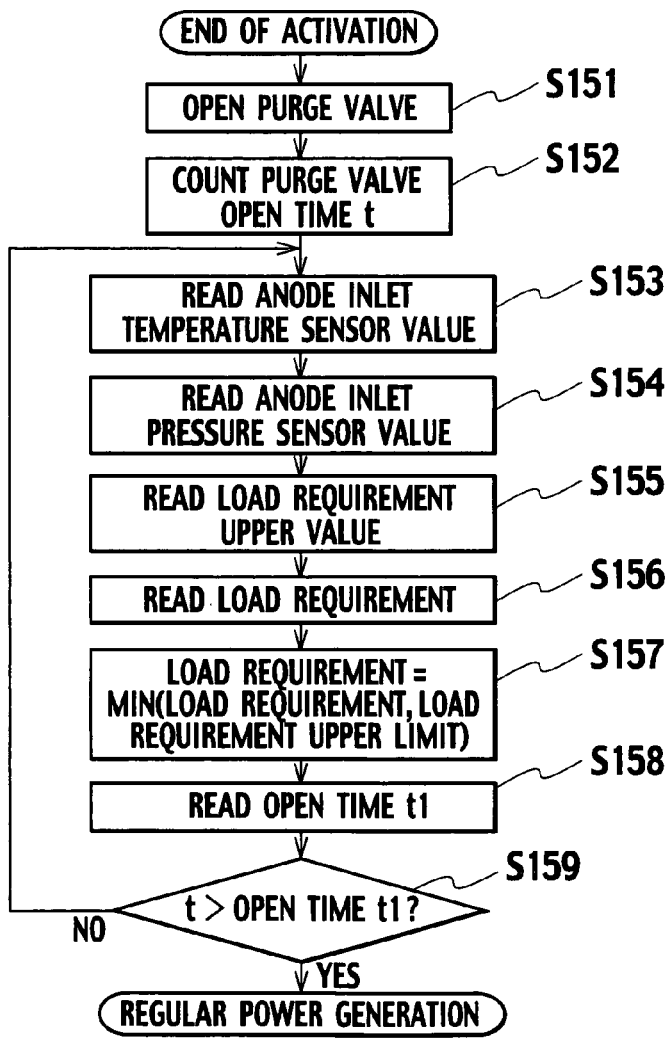
FIG. 25 is a flowchart showing a flow of a control process by a fuel cell system as a thirteenth embodiment of the present invention.

A fuel cell system as a thirteenth embodiment of the present invention has the same configuration as that of the fuel cell system as the first, second, or ninth embodiment of the present invention. The controller 21 executes the following control process after the activation process to prevent degradation of the components of the fuel cell system. Hereinafter, a description is given of an operation of the system controller 21 executing the control process with reference to a flowchart shown in FIG. 25. Processes of steps S151 to S154 and S156 to S159 shown in FIG. 25 are the same as those of the steps S141 to S144 and S146 to S149 shown in FIG. 23, respectively. The description thereof is therefore omitted below, and only a process of step S155 is described.

Figure 26:
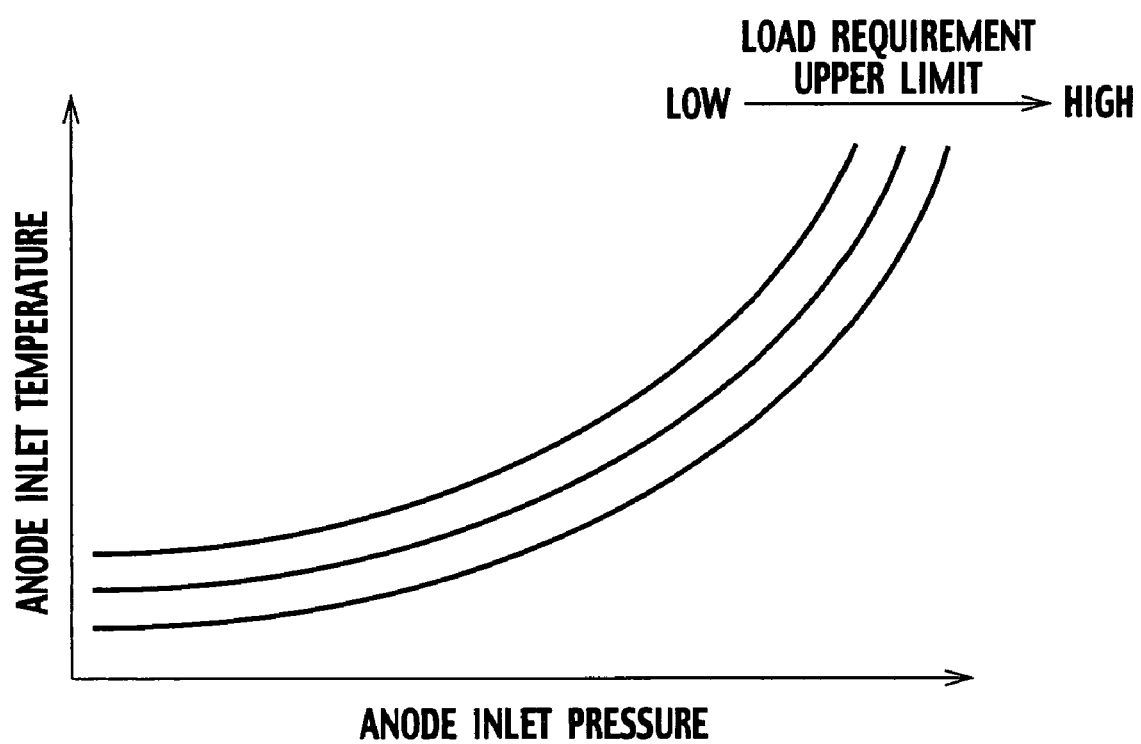
FIG. 26 is a diagram showing relationships between the anode inlet pressure and anode inlet temperature for upper limits of the load requirement.

In the process of the step S155, referring to a map indicating relationships between the anode inlet temperature and the anode inlet pressure for upper limits of the load requirement in FIG. 26, the system controller 21 reads the upper limit of the load requirement corresponding to the anode inlet temperature and pressure detected in the steps S153 and S154. Generally, the vapor concentration increases as the anode inlet temperature increases, and the concentration of gas not contributing to power generation increases as the anode inlet pressure decreases. When the hydrogen concentration is reduced and the load requirement is high, the gas circulator 11 cannot ensure the amount of hydrogen necessary for power generation. In the map shown in FIG. 26, the amount of hydrogen which can be supplied to the anode 2a is calculated based on the hydrogen concentration according to the anode inlet temperature and pressure and the flow rate performance of the gas circulator 11, and the upper limit of the load requirement is set in terms of the anode inlet temperature and pressure. The process of the step S155 is thus completed, and the control process proceeds from the step S155 to a process of step S156.

As apparent from the above description, according to the fuel cell system as the thirteenth embodiment of the present invention, the system controller 21 limits the output of the fuel cell stack according to the anode inlet pressure and temperature while the purge valve 12 is opened. It is therefore possible to avoid shortage of hydrogen supplied to the anode 2a and prevent degradation of the components of the fuel cell stack 2.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The entire content of Japanese Patent Application No. TOKUGAN 2004-199400 with a filing date of Jul. 6, 2004, is hereby incorporated by reference.

What is claimed is:

1. A fuel cell system, comprising:
   a fuel cell stack configured to have a plurality of fuel cells;
   a fuel gas supply unit configured to supply fuel gas to an anode of the fuel cell stack;
   an oxidant gas supply unit configured to supply oxidant gas to a cathode of the fuel cell stack
   a gas circulator configured to circulate anode off gas discharged from the anode to the anode;
   a purge valve configured to discharge the anode off gas to the outside; and
   a controller configured to, at an activation time of the system, close the purge valve, drive the gas circulator, and supply the fuel gas from the fuel gas supply unit to the anode,
   wherein after a predetermined condition has been satisfied, the controller increases an anode operating pressure to a target operating pressure.

2. The fuel cell system according to claim 1, wherein
   the controller increases the anode operating pressure and cathode operating pressure to the target operating pressures at a predetermined time after starting driving the gas circulator, wherein the predetermined condition is a pump driven time is greater than an oxygen concentration decreasing time.

3. The fuel cell system according to claim 1, further comprising:
   an oxygen concentration detection unit configured to detect oxygen concentration in the anode off gas,
   wherein the controller increases the anode operating pressure and cathode operating pressure to the target operating pressures upon the oxygen concentration detected by the oxygen concentration detection unit decreasing to a predetermined value or less, and
   wherein the predetermined condition is the detected oxygen concentration is less than a predetermined oxygen concentration.

4. The fuel cell system according to claim 1, further comprising:
   an oxygen concentration detection unit configured to detect oxygen concentration in the anode off gas,
   wherein the controller increases the anode operating pressure and cathode operating pressure to the target operating pressures at a predetermined time after starting driving the gas circulator or upon the oxygen concentration detected by the oxygen concentration detection unit decreasing to a predetermined value or less, and
   wherein the predetermined condition is the detected oxygen concentration is less than a predetermined oxygen concentration or a pump driven time is greater than an oxygen concentration decreasing time.

5. The fuel cell system according to claim 2, wherein
   the controller measures time elapsed from when the system stops to when the system starts and adjusts the predetermined time according to the elapsed time.

6. The fuel cell system according to claim 1, wherein
   the controller adjusts the target operating pressures according to a load requirement for the fuel cell system.

7. The fuel cell system according to claim 1, wherein
   the controller adjusts the target operating pressures according to operating temperature.

8. The fuel cell system according to claim 1, further comprising:
   a cell voltage detection unit configured to detect cell voltage of the fuel cell stack, wherein
   the controller adjusts the target operating pressures according to the cell voltage detected by the cell voltage detection unit.

9. The fuel cell system according to claim 1, wherein
   the controller stops driving the oxidant gas supplying unit until just before increasing the anode operating pressure and cathode operating pressure to the target operating pressures.

10. The fuel cell system according to claim 1, further comprising:
    a differential pressure detection unit configured to detect differential pressure between the anode operating pressure and cathode operating pressure, wherein
    the controller drives the oxidant gas supply unit according to the differential pressure detected by the differential pressure detection unit to supply the oxidant gas to the cathode.

11. The fuel cell system according to claim 1, further comprising:
    a mixer configured to mix the fuel gas supplied from the fuel gas supply unit and the anode off gas supplied from the gas circulator and supplies the mixed gas to the anode.

12. The fuel cell system according to claim 1, wherein
    the controller increases the anode operating pressure and cathode operating pressure to the target operating pressures, then opens the purge valve with the anode operating pressure and cathode operating pressure maintained at the target operating pressures to adjust the cathode operating pressure and anode operating pressure according to a load requirement.

13. The fuel cell system according to claim 12, wherein the controller adjusts a period the purge valve is open according to operating temperature.

14. The fuel cell system according to claim 12, wherein the controller limits an output of the fuel cell stack according to the target operating pressures during the period when the purge valve is open.

15. The fuel cell system according to claim 14, wherein the controller limits output of the fuel cell stack according to the target operating pressures and the operating temperature during the period when the purge valve is open.

16. The fuel cell system according to claim 1, wherein the controller increases cathode operating pressure to target operating pressure after the predetermined condition is satisfied.

* * * * *